(12) United States Patent
Solli

(10) Patent No.: US 7,072,098 B2
(45) Date of Patent: Jul. 4, 2006

(54) METHOD AND APPARATUS FOR POLARIZATION CONTROL WITH PHOTONIC CRYSTALS

(76) Inventor: Daniel Roy Solli, 6228 Estates Dr., Oakland, CA (US) 94611

( * ) Notice: Subject to any disclaimer, the term of this patent is extended or adjusted under 35 U.S.C. 154(b) by 0 days.

(21) Appl. No.: 10/766,105

(22) Filed: Jan. 28, 2004

(65) Prior Publication Data

US 2004/0184129 A1    Sep. 23, 2004

Related U.S. Application Data

(60) Provisional application No. 60/505,046, filed on Sep. 24, 2003, provisional application No. 60/442,999, filed on Jan. 29, 2003.

(51) Int. Cl.
*G02F 1/00* (2006.01)
*G02B 6/00* (2006.01)

(52) U.S. Cl. .................... 359/321; 385/122
(58) Field of Classification Search ............ 359/237, 359/238, 247, 321, 326–332; 385/24, 31, 385/122; 372/21–22
See application file for complete search history.

(56) References Cited

U.S. PATENT DOCUMENTS

| 5,838,702 A | * | 11/1998 | Byer et al. ............ 372/21 |
| 6,710,912 B1 | * | 3/2004 | Filkins et al. ......... 359/326 |
| 2001/0012149 A1 | * | 8/2001 | Lin et al. ............. 359/344 |

* cited by examiner

*Primary Examiner*—Hung Xuan Dong
*Assistant Examiner*—William Choi
(74) *Attorney, Agent, or Firm*—Bruce H. Johnsonbaugh

(57) ABSTRACT

An optical apparatus and method are provided for controlling the polarization of light. An incoming beam is directed at a photonic crystal. The photonic crystal is designed to act as a transmission quarter-waveplate or half-waveplate; as a reflection waveplate; or as a polarizer. In addition, the photonic crystal may be designed to accomplish phase matching in nonlinear optical mixing processes, as well as obtaining other selected effects upon incoming beams having known polarizations.

9 Claims, 16 Drawing Sheets

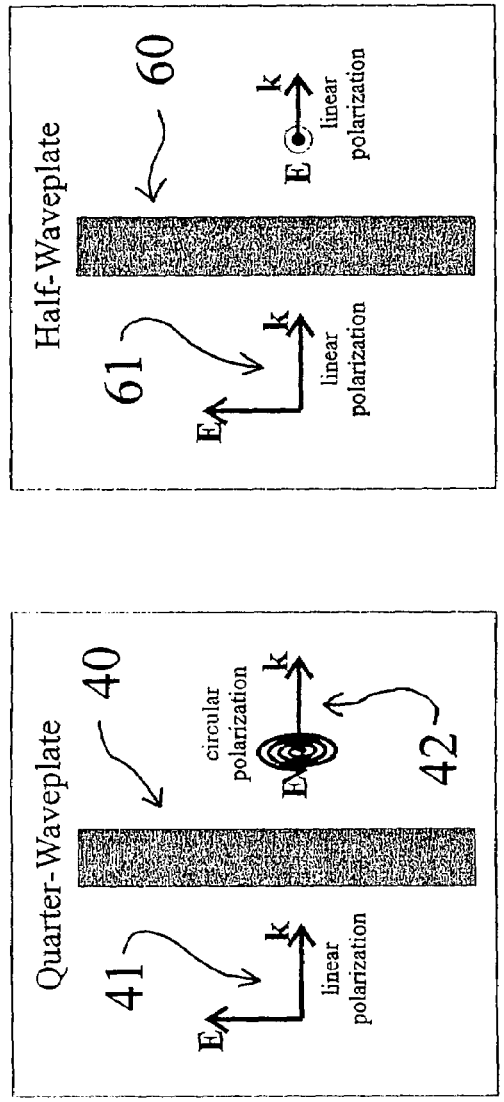
Fig. 2A
Fig. 2B
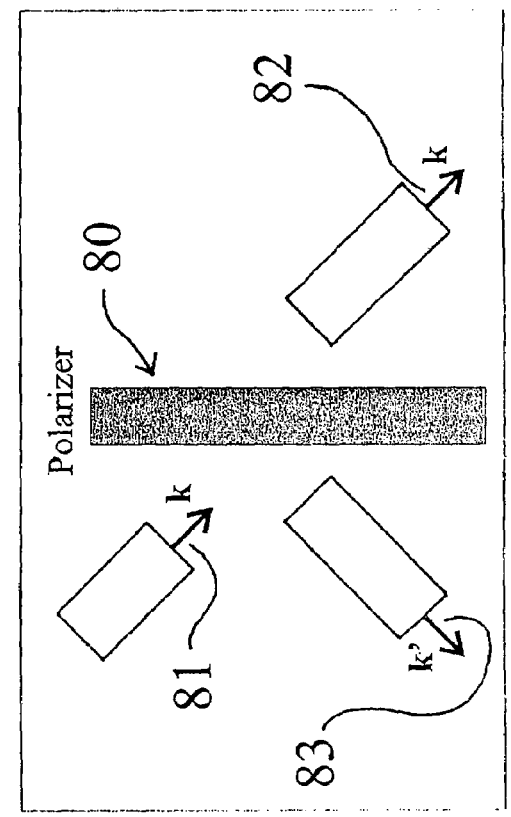
Fig. 2C

Crystal can be constructed with any optic axis angle θ
(Direction of propagation into or out of the page)

US 7,072,098 B2

METHOD AND APPARATUS FOR POLARIZATION CONTROL WITH PHOTONIC CRYSTALS

CROSS-REFERENCE TO RELATED APPLICATIONS

This application claims the benefit of and priority from U.S. Provisional Application Ser. No. 60/442,999 filed on Jan. 29, 2003 and U.S. Provisional Application Ser. No. 60/505,046 filed on Sep. 24, 2003.

INTRODUCTION, BACKGROUND AND SUMMARY OF INVENTION

The present invention relates to polarization control in general. More particularly, the invention provides for the first time, a method and apparatus for complete polarization control of electromagnetic (EM) waves using photonic crystals. The novel apparatus utilizing the invention includes, for example, photonic-crystal-based transmission waveplates, polarizers, and reflection waveplates. These devices have tremendous advantages over the prior art: they can be much smaller than prior art devices, of the order of magnitude of one thousand times smaller; they can also be adjusted and modified to fit end uses more extensively than the prior art; and they can be scaled to any wavelength range including, but not limited, to the microwave, infrared, visible, and ultraviolet portions of the EM spectrum. It is also important that the birefringent properties of photonic crystals are related to the lattice geometry and indices of refraction of the constituent materials; thus, the birefringent and/or dispersive properties of photonic crystals can be tailored by adjusting the lattice geometry and size, as well as altering the constituent materials and their relative proportions.

Photonic crystal birefringence has a range of potential applications. For example, these and related photonic-crystal devices will be useful in laboratory equipment, and to control the flow of light in circuits and all-optical devices for communication and computing purposes.

Furthermore, the use of photonic crystal birefringence and dispersion can be utilized in nonlinear optics to achieve phase-matching. This will afford many advantages over conventional phase-matching techniques. For example, in the prior art, phase matching in nonlinear optical processes is typically accomplished with birefringent, nonlinear materials. Although there are many types of materials with optical nonlinearity, few are also sufficiently birefringent. However, a photonic crystal can be birefringent and/or dispersive even if its constituent materials are neither birefringent, nor dispersive; therefore, using a photonic crystal constructed from a material with optical nonlinearity, it is possible to achieve phase matching without a material that is intrinsically birefringent.

It is also possible to utilize photonic-crystal birefringence to couple two different modes (e.g., modes of polarization) for the purpose of creating an optical delay line. This type of delay line can in fact be created using any birefringent medium, which need not necessarily be photonic-crystal-based.

A primary object of the invention is to provide a method and apparatus for controlling and/or manipulating the polarization of electromagnetic (EM) waves with photonic crystals.

A further object is to provide a photonic crystal transmission waveplate capable of manipulating the polarization of light transmitted through the photonic crystal.

A further object is to provide a photonic crystal reflection waveplate capable of manipulating the polarization of light reflected by the crystal.

Another object of the invention is to provide a photonic crystal polarizer capable of reflecting one polarization and transmitting the other polarization (of a single wavelength), and which is not limited by Brewster's angle, so that the polarized reflected and transmitted beams can have any angle relative to the incident beam.

A further object is to provide a method of polarization control using photonic crystals for controlling the flow of light in circuits and all-optical devices used in laboratory equipment, communications, and computers.

Another object is to provide a method of polarization control using photonic crystals to achieve phase-matching in nonlinear optics.

Another object is to provide a method of creating a novel delay line for electromagnetic (EM) waves using energy transfer between different electromagnetic modes.

Other objects and advantages of the invention will become apparent from the following description and drawings wherein:

BRIEF DESCRIPTION OF THE DRAWINGS

FIG. 2A illustrates a photonic crystal quarter-waveplate according to the present invention and shows an incident linearly polarized beam entering the crystal and being transformed to a circularly polarized wave by the crystal;

FIG. 2B is a schematic representation of a photonic crystal half-waveplate utilizing the present invention wherein orthogonal components of an incoming polarized wave experience a relative phase shift of 180° as they are transmitted through the crystal; thus, the polarization of an incoming beam is rotated by the crystal as shown;

FIG. 2C is a schematic representation of a photonic crystal polarizer of the present invention utilized to transmit one specific polarization through the crystal and simultaneously reflect the other polarization;

DETAILED DESCRIPTION

Theory of Operation and Experimental Results

Figure 1A:
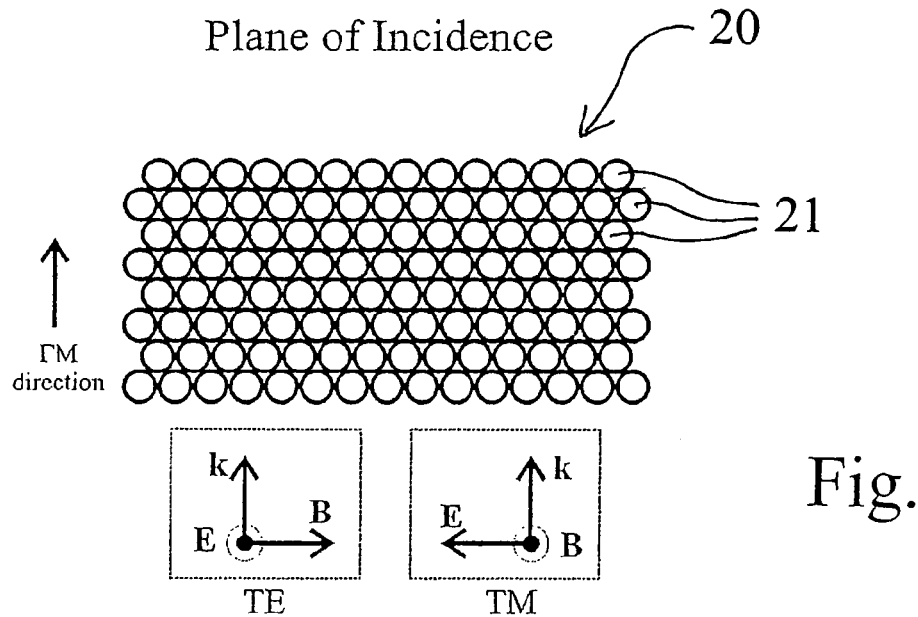
FIG. 1A is a top or plan view of an example of a two-dimensional (2D) photonic crystal used in the present invention wherein the periodic plane or plane of incidence is parallel with the plane of the drawing.

A photonic crystal as known in the prior art is a periodic crystalline structure that possesses a unique band structure for electromagnetic (EM) waves. Typically, photonic crystals are composed of dielectric materials arranged in an array with a well-defined geometry, periodic in one or more dimensions. EM waves incident on the structure produce multiple Bragg reflections from the many material interfaces that compose the structure. These multiple reflections interfere with each other to produce band gaps in the spectrum of the structure. Radiation whose frequency and wavevector lies within a band gap is exponentially attenuated as it propagates through the crystal. The characteristic band structure of a photonic crystal is specific to its geometry and material composition, including the indices of refraction and relative proportions of the different components. Although the basic physics behind photonic structures is application of Maxwell's equations, the complex boundary conditions at the material interfaces produce a wealth of interesting and novel phenomena. Since Maxwell's equations are scale invariant, results obtained at any wavelength apply to photonic crystals designed for any portion of the EM spectrum.

There are many useful analogies between the EM band structure of photonic crystals and the electronic band structure of solid-state materials. However, there is an essential difference between the two cases: scalar theory is usually adequate in solid-state physics, but a full vectorial approach is in general necessary for photonic crystal calculations. This difference has been largely overlooked, leaving many interesting polarization-dependent phenomena of the present invention heretofore undiscovered.

Any photonic structure with anisotropy should in general show polarization-dependent properties. In particular, if different polarizations experience different boundary conditions, the crystal should display a polarization-dependent band structure.

In addition to the well-known power transmission effects of photonic crystals, nontrivial phase delays are also imparted to waves traveling within them. Although the power or intensity effects of photonic crystals have been well studied, phase effects, especially in transparent spectral regions, have been heretofore ignored. It is possible to understand these phase effects by analogy with absorptive systems. Although dielectric photonic crystals have negligible absorptive dissipation, they have frequency-dependent reflectivity. In particular, energy that is not transmitted by the band gap is instead reflected. It is well known that a spectral region of absorption generates effects on the phase of transmitted waves, even in spectral regions far from the absorption line (i.e., transparent regions). This phenomenon is in fact required by causality through the Kramers-Kronig relations. Since the Kramers-Kronig relations are not specific to absorption only, we can expect similar results if they are applied to the frequency-dependent transmission profile of a photonic crystal band-structure. Thus, if the band structure of a photonic crystal is polarization-dependent, application of the Kramers-Kronig relations shows that there must be polarization-dependent (i.e., birefringent) phase effects, even in transparent spectral regions.

The polarization-dependent properties of photonic crystals are, for the first time, exploited with the present invention for the purpose of controlling the polarization of EM waves. In particular, photonic crystals are used for the first time as novel, compact waveplates, polarizers, and polarizing-beamsplitters capable of polarization control that can be precisely tailored by modifying the material composition as well as the geometry of the structure.

Photonic Crystals Used in Experiments

Figure 1B:
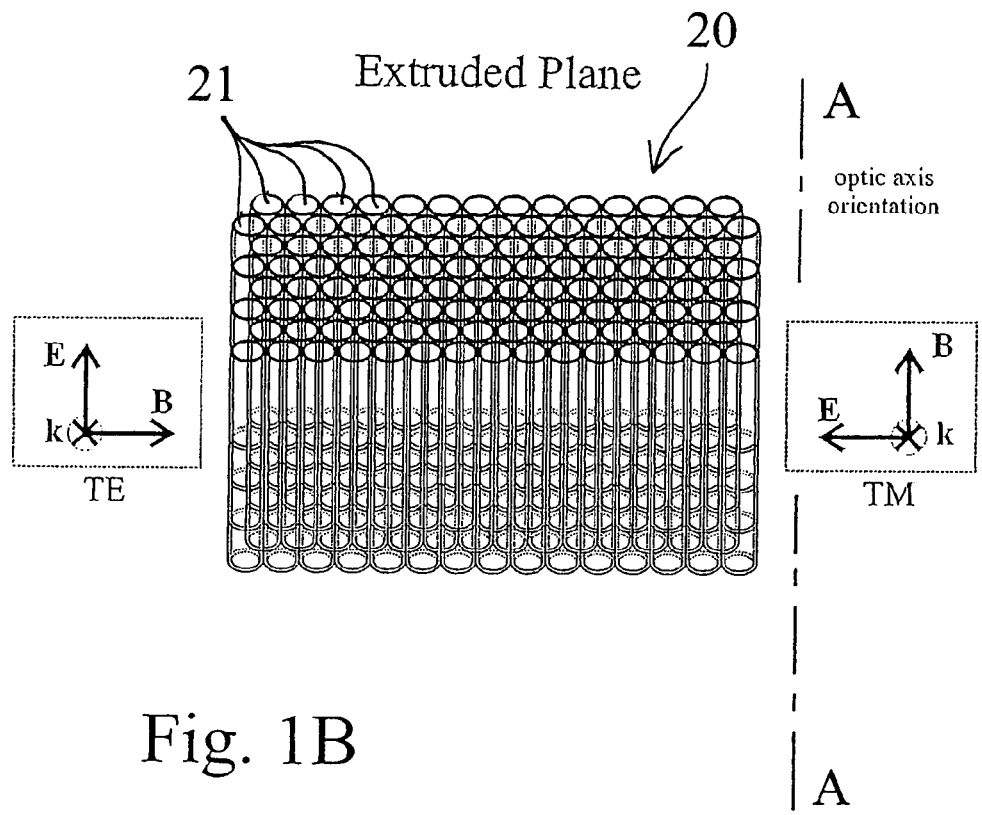
FIG. 1B is a side perspective view of the two-dimensional (2D) photonic crystal illustrated in FIG. 1A and wherein the optic axis is shown as A—A and extends in a direction parallel to the longitudinal axis of each of the elongated (extruded) hollow rods which form the illustrated crystal.

As practical examples of these devices, it is useful to consider and conduct experiments with two-dimensional (2D) photonic structures as shown in FIGS. 1A and 1B. These structures have a 2D-periodic lattice and are non-periodic or extruded in their third dimension. Bulk and slab 2D-crystals are subsets of this class: bulk crystals are much larger in their extruded dimension than a lattice spacing, whereas, slabs are on the order of or less than a lattice spacing long in their extruded dimension. These structures have band gaps for EM radiation propagating in the plane of periodicity. Typically, slabs have a well-formed band gap only for polarization parallel to the periodic plane (transverse magnetic polarization [TM]), and a small, incomplete band gap for polarization perpendicular to this plane (transverse electric polarization [TE]). On the other hand, bulk crystals seem to possess band gaps for both polarizations. An example of a specific 2D geometry is the hexagonal lattice (see FIG. 1A).

One method for constructing a 2D lattice involves stacking elongated, hollow rods in an array of the desired geometry, as shown in FIGS. 1A and 1B. For example, a hexagonal-lattice photonic crystal 20 can be constructed by stacking a plurality of rods 21 in a triangular array. The lattice geometry in this example is hexagonal, although many other geometries are possible. E, B and k label the electric field vector, the magnetic field vector, and the wavevector, respectively. A cross indicates a vector pointing into the page, whereas a point indicates a vector pointing out of the page. The E, B, and k groupings are meant to illustrate transverse magnetic (TM) and transverse electric (TE) waves propagating in the ΓM direction (as shown) with respect to the crystal, although the crystal is also birefringent along other propagation directions. It has been experimentally observed that such a bulk, hexagonal structure composed of hollow acrylic rods (index of refraction 1.61) with outer diameters of ½ inch and inner diameters of ⅜ inch (air-filling fraction [AFF]=air volume/total volume=0.60) has a fundamental TM band gap centered at roughly 11 GHz and a fundamental TE band gap centered at roughly 10.5 GHz (for propagation in the ΓM direction, see FIG. 1A). The widths of the TM and TE band gaps are approximately 1.5 GHz and 1 GHz, respectively. For a 20-layer, bulk, hexagonal structure with these specifications, the field (amplitude) transmission is roughly 1/100 at the bottom of the TM gap, and 1/50 in the TE gap. Microscale crystals appropriate for optical frequencies are typically constructed using microfabrication techniques.

It is possible to provide a mathematical illustration of the existence of birefringence in a photonic crystal. Here is a simple model that shows birefringence in a photonic crystal using the Kramers-Kronig relations.

Suppose we assume for the field transmission $$\tilde{T}(\omega) = e^{i\tilde{n}(\omega)kd} \quad (1)$$

where $\tilde{n}(\omega)$ is the complex index of refraction as a function of angular frequency $\omega$, k is the magnitude of the wavevector in free space (k=ω/c where c is the speed of light), and d is the path length through the structure. The complex index of refraction can be broken up into its real and imaginary parts; the real part represents ordinary refraction, and the imaginary part represents attenuation as the wave propagates through the structure:

$$\tilde{T}(\omega) = e^{-Im[\tilde{n}(\omega)]kd} e^{iRe[\tilde{n}(\omega)]kd} \quad (2)$$

Thus, the amplitude transmission is $$|\tilde{T}(\omega)| = e^{-Im[\tilde{n}(\omega)]kd}, \quad (3)$$

As part of the simple model, we assume that the amplitude transmission has a simple periodic square-shaped form, with unity transmission everywhere except the band gap, which has constant transmission of $T_0$. The fundamental band gap is centered at $\omega_0$ and extends from $\omega_0-\epsilon$ to $\omega_0+\epsilon$ and is thus $2\epsilon$ in width. It is also assumed that there are higher order band gaps at $m\omega_0$ with spans from $(\omega_0-\epsilon)$ to $(\omega_0+\epsilon)$, where m is an integer greater than or equal to 2 and less than some reasonable cut-off value (beyond the cut-off, there are no additional band gaps). For simplicity, it will be assumed that this band structure persists until m=10. It will also be assumed that this simple amplitude-transmission spectrum is polarization dependent, with $T_0$, $\omega_0$, and $\epsilon$ different for TM and TE polarizations. For the purposes of the model, the approximate specifications described above for the center frequencies and widths of the fundamental TM and TE band gaps of a 20-layer, hexagonal-lattice crystal will be used. It will also be assumed that $T_0 \approx 1/100$ for TM waves and $T_0 \approx 1/50$ for TE waves. The crystal thickness d of a 20-layer, hexagonal-lattice crystal with component rod outer diameter of ½ inch is approximately 22 cm.

Figure 7:
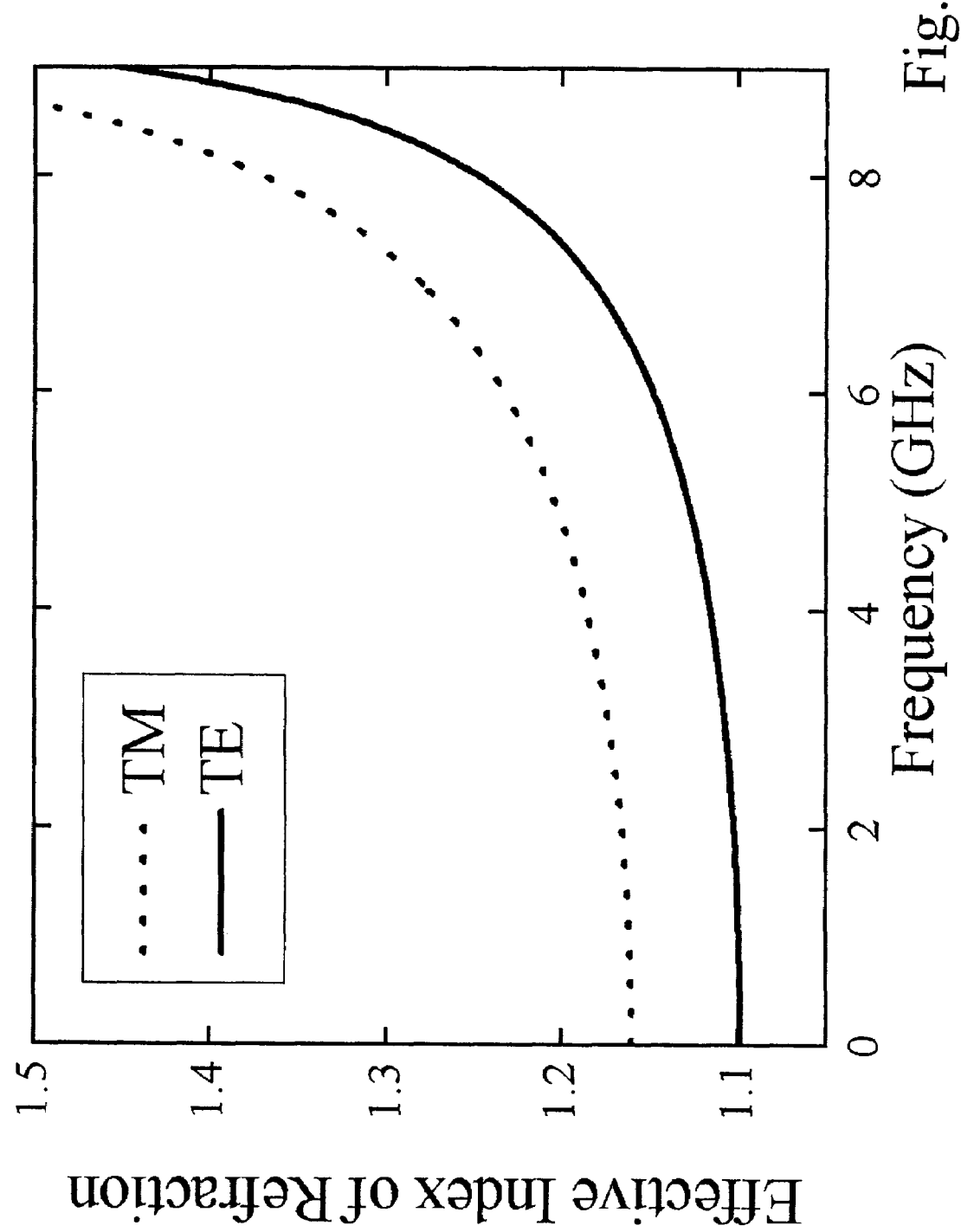
FIG. 7 is a graphical representation illustrating the existence of birefringence in a photonic crystal with respect to frequency (based on a simple model)

The Kramers-Kronig relations can be used to directly calculate $Re[\tilde{n}(\omega)]-1$ given $Im[\tilde{n}(\omega)]$, and vice versa. In this case, we use the assumed amplitude transmission characteristics to determine $Im[\tilde{n}(\omega)]$ from Equation (3), then use one of the Kramers-Kronig relations to calculate $Re[\tilde{n}(\omega)]-1$. Performing this calculation as described for TE and TM waves, a clear birefringence (i.e., a difference between the effective TM and TE indices of refraction) is found with $Re[\tilde{n}(\omega)]$ larger for TM waves in the transparent region below the fundamental band gap, as shown in the plot of FIG. 7. Similar results can be obtained in the transparent regions between the band gaps as well.

This simple mathematical model is meant to demonstrate the basic principle that a polarization-dependent band structure is equivalent to birefringence in the refractive properties of the crystal. It is a simplification in that the band gaps are assumed to have simple square shapes and higher frequency gaps have the same widths and depths, and occur only at integer multiples of the fundamental. In actuality, these parameters, as well as the shapes of the band gaps depend on the polarization as well as the order of the gap. Thus, in general, the actual birefringence can be substantially different from the results of this simple model. In fact, it will be shown from experimental results that the TE index of refraction is actually larger than that of the TM polarization for this crystal. Because of its simplicity, this model is not meant to provide any quantitative results, but to illustrate that birefringence can be inferred from a polarization-dependent transmission spectrum.

Photonic Crystal Waveplates

The model described above shows a relatively large birefringence (i.e., on the order of a few percent) in a transparent spectral region of the crystal. Since the actual birefringence of a 2D photonic crystal should typically be larger than this, photonic crystals for the first time may be utilized as compact waveplates (e.g., half- and quarter-waveplates) in the transparent regions between their band gaps as shown in FIGS. 2A and 2B.

The photonic-crystal quarter-waveplate (QWP), shown generally as 40 in FIG. 2A, is a birefringent photonic crystal whose thickness is such that TM and TE polarized waves experience a relative phase shift of π/2 or 90°. A QWP will, in general, create an elliptical (or circular) polarization 42 from an incident linear polarization 41 and vice versa. If the incident linear polarization is oriented at 45° to the optic axis of the crystal, a circularly polarized wave is created.

The novel photonic crystal half-waveplate (HWP), shown generally as 60 in FIG. 2B, is a birefringent photonic crystal whose thickness is such that TM and TE polarized waves experience a relative phase shift of π or 180° upon transmission. A HWP such as 60 will rotate the polarization of an incident linearly polarized wave 61 by −2θ (if θ is the angle between the incident polarization and the optic axis of the crystal) to a transmitted wave 62 rotated as shown in FIG. 2B. Especially at optical frequencies, these devices are particularly novel. Since a conventional optical waveplate usually has a birefringence orders of magnitude smaller than that of a photonic crystal, the thickness of a conventional waveplate must typically be orders of magnitude thicker than a comparable photonic crystal waveplate. Furthermore, since the band structure of a photonic crystal is strongly dependent on its geometry and material composition, its birefringent properties can be tailored to the particular situation and circumstances of the application. A photonic crystal waveplate would be used just as a conventional waveplate, with the optic axis of a photonic crystal waveplate is defined by the anisotropy of the structure. For example, the optic axis A—A of the 2D, bulk, hexagonal-lattice crystal described above, and as shown in FIG. 1B, is parallel to the longitudinal axes of the component rods.

A photonic crystal waveplate of the present invention can be used to manipulate the polarization of transmitted light. However, photonic crystals are unique in that they can also be used to manipulate the polarization of reflected light. In particular, light that is not transmitted by a photonic crystal (i.e., blocked by the band gap) is reflected. Thus, the reflection spectrum of a photonic crystal must be polarization-dependent just as the transmission spectrum. Just as in the transmission case, this polarization-dependent reflection spectrum also equates with birefringence in the phases imparted to reflected waves. Thus, a photonic crystal can be used for the first time as a reflection waveplate in regions where the band gaps for the independent polarizations overlap (i.e., spectral regions in which both polarizations are completely reflected). In particular, it is possible to design photonic crystal reflection waveplates for which the reflected TM and TE polarizations are completely reflected and develop a relative phase of ¼ or ½ of a wave upon reflection. Reflection waveplates based only on dielectric materials are novel devices, and have no direct conventional analog.

Photonic Crystal Polarizer

Another device useful for polarization control is the novel linear polarizer of the present invention, as shown generally as 80 in FIG. 2C. A photonic crystal can be used for the first time as a polarizer by exploiting the separation between the band gaps for the independent polarizations. In particular, any crystal, which has a spectral region in which only one of the independent polarizations is entirely transmitted, can be used as a polarizer. Thus, a good photonic-crystal polarizer should have well separated band gaps. In the region of non-overlap, one polarization must be almost entirely transmitted, while the other is almost completely reflected. A 2D photonic crystal polarizer such as 80 would be used in the same manner as a conventional polarizer. Photonic crystal polarizers will be useful in that relatively thin crystals should produce high contrast in the transmission of different polarizations. In addition, their bandwidths and other properties can be manipulated by tailoring the geometry and material composition of the crystal. Furthermore, they do not rely on absorption, and thus, they are not heated by incident radiation. For example, some conventional optical polarizers absorb the power they do not transmit, and are therefore heated and can be easily destroyed by lasers of even modest power.

Since the photonic crystal polarizer 80 interacting with incident beam 81 reflects one polarization shown by reflected beam 83 and transmits the other shown as transmitted beam 82 (FIG. 2C), it is similar to a polarizing beamsplitter. Conventional polarizing beamsplitters are optical elements that produce polarized beams based on Brewster's law. Thus, the angle between the incident and reflected rays is limited by Brewster's angle. In contrast, photonic crystals do not rely on Brewster's angle and can produce polarized reflected and transmitted beams at any angle relative to the incident beam, depending on the angle between the incident beam and the surface of the crystal. The extreme example is a retro-reflected polarized beam, which cannot be directly produced by a conventional polarizing beamsplitter.

Figure 3:
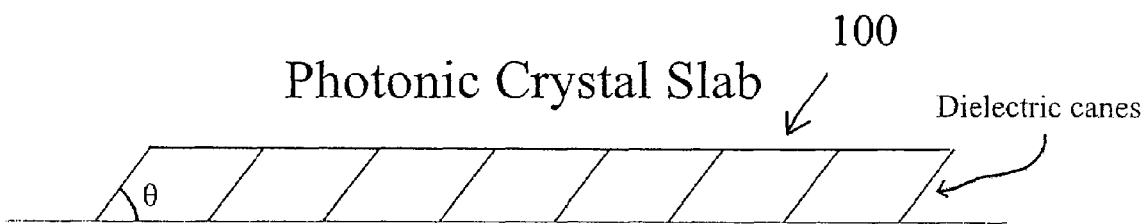
FIG. 3 is a schematic representation of a photonic crystal slab showing the slab in a side sectional view.

Both slab and bulk 2D photonic crystals can be used as waveplates and polarizers. Although these devices have been described here so far in the context of bulk crystals, they can be realized with slabs as well as shown in FIG. 3. An example of a 2D photonic slab (side view) is shown as 100. Slab crystals have significantly different band structures than bulk crystals, but slab crystals should also be useful for polarization control because their transmission band structures are highly polarization-dependent. This design should be useful for planar photonic crystal circuits. As previously mentioned, slab crystals show only a small band gap for one of the polarizations, but a well-formed gap for the other polarization, and thus can be used as polarizers. Furthermore, since the degree of birefringence of a photonic structure is related to the degree of polarization-dependence in its transmission band structure, 2D slab crystals should have a very large birefringence. FIG. 3 shows a photonic crystal slab fabricated so that it could be used to manipulate polarization while still remaining flat on a planar surface (i.e., the crystal itself does not need to be rotated to manipulate incident horizontal and vertical polarizations); in this way, the optic axis can be at some angle relative to an incident polarization and the crystal can remain flat. The compact polarization control afforded by photonic crystals will be useful in photonic crystal circuits. Photonic crystal circuits are compact optical devices based on photonic crystal technology. They require compact, integrable polarization control for their operation.

Figure 4A:
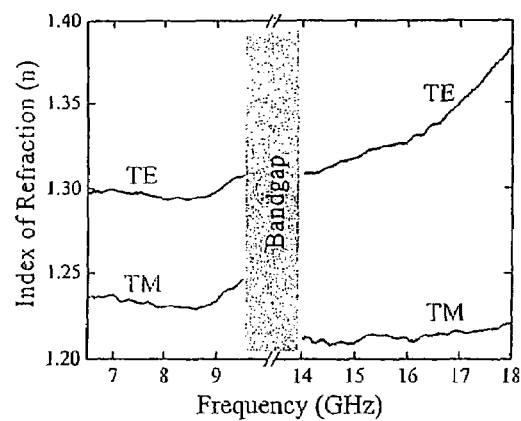
FIGS. 4A and 4B are graphical representations of experimentally measured indices of refraction in the transparent spectral regions of hexagonal photonic crystals (lattice constant ½ inch, air-filling fraction [AFF] 0.60)
Figure 4B:
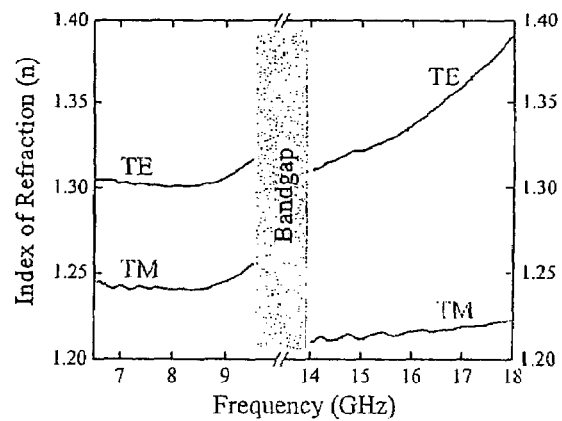

Experimental evidence for the birefringence in photonic crystals and some potential applications are also shown and described herein. The data presented was collected using microwave radiation. Microwave transmission through a hexagonal-lattice crystal, as shown in FIGS. 1A and 1B (see previously described specifications), was measured with a Hewlett-Packard vector network analyzer (VNA). Radiation was coupled to and from free space with microwave gain-horn antennae. The crystal was placed in a shielded box with an aperture (measuring 14×17 cm$^2$) smaller than the cross-section of the crystal, but large enough to minimize diffraction effects. The shielded box was placed in the far-field of the transmitter horn, and the receiver horn was positioned directly behind the crystal inside the box. The aperture and positioning were used so that the microwaves incident on the crystal would be effectively plane waves. The horn antennae are sensitive to only a single linear polarization; thus, it was possible to measure the phase delay as a function of frequency for microwaves propagating in the ΓM direction relative to the crystal, with both TM and TE linear polarizations. Using the measured phase delay, an effective index of refraction could be calculated for each polarization. It was found that there is a difference on the order of 10% between the indices of refraction for the two polarizations. Since the birefringence is a result of interference effects in the asymmetric crystal, the indices of refraction can depend on whether the number of layers in the crystal is even or odd. Representative experimental results for the TM and TE indices of refraction are shown in FIGS. 4(a) and 4(b) for the transparent regions above and below the fundamental band gap of 8- and 16-layer hexagonal-lattice crystals, respectively. Using the measured birefringence, it is possible to compute the frequencies at which TE and TM waves propagating through the same length of crystal would accumulate a net phase difference of ¼ or ½ of $2\pi$. At these frequencies, the crystal acts as a quarter- or a half-waveplate, respectively. Specifically, if the total relative phase shift is $\pi/2$ $(2m+1)$ for an integer m greater or equal to 0, the crystal acts as a quarter-waveplate of $(m+1)^{th}$ order. On the other hand, a relative phase shift of $\pi(2m+1)$ is produced by a half-waveplate of $(m+1)^{th}$ order. Thus, for a quarter-waveplate of $(m+1)^{th}$ order at frequency $\omega$, the birefringence must be $$|\Delta n(\omega)| = \frac{\pi c}{\omega d}\left(m + \frac{1}{2}\right). \quad (4)$$

Similarly, for a half-waveplate, we have $$|\Delta n(\omega)| = \frac{2\pi c}{\omega d}\left(m + \frac{1}{2}\right). \quad (5)$$

In what follows, the right-hand sides of Equations (4) and (5) will be defined as the quarter-wave condition (QWC) and half-wave condition (HWC), respectively, of $(m+1)^{th}$ order.

Figure 4C:
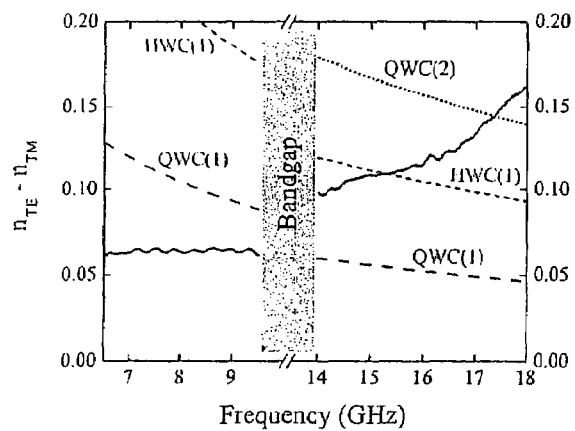
FIGS. 4C and 4D are graphical representations of the experimentally measured differences between the TE and TM indices of refraction in the transparent spectral regions of hexagonal-lattice photonic crystals, along with corresponding half-wave conditions (HWC) and quarter-wave conditions (QWC)
Figure 4D:
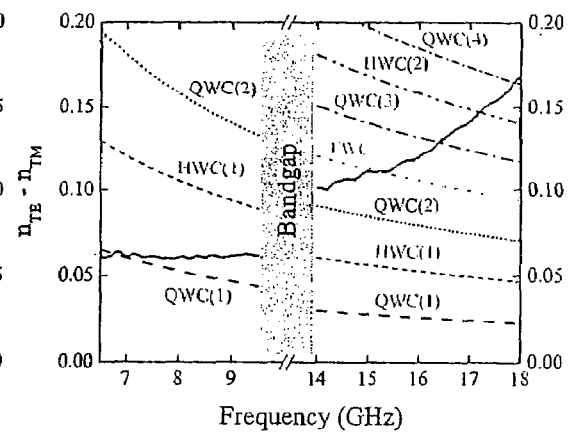

In FIGS. 4C and 4D, the differences between the indices of refraction for 8- and 16-layer crystals along with calculated QWCs and HWCs of the indicated order are shown. The intersection of a quarter- or half-wave condition curve with the experimentally measured index difference indicates that the crystal acts as the corresponding waveplate at that frequency.

Figure 5A:
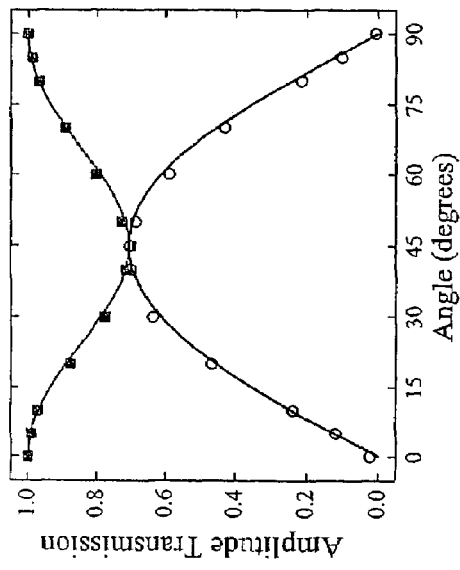
FIG. 5A is a graphical representation of experimental measurements of intensity transmission through a photonic crystal as a function of frequency.

Using these experimental predictions, 8-layer quarter- and half-waveplates were tested. By rotating the crystal (about an axis parallel to the ΓM direction) so that the incident polarization makes an angle of 45° with the optic axis (here, the optic axis is parallel to the component rods and the incident wave propagates completely in the periodic plane), a circularly polarized wave should be produced if the incident wave has the quarter-waveplate frequency. At this frequency, the receiver horn should detect the same power transmission as it is rotated to any angle about the ΓM direction (the receiver horn detects the linear projection of the circular polarization). The results of this experiment with an 8-layer crystal are shown in FIG. 5A. Notice that all the traces cross at the same frequency predicted by the data in FIG. 4C.

In another set of experiments, both horns were rotated simultaneously (about an axis parallel to the ΓM direction) in the aligned configuration, while the transmission at a fixed frequency was measured as a function of the receiver horn angle (horns parallel). This procedure was also repeated with the transmitter-horn antenna maintained at a constant 90° relative to the receiver-horn antenna as both were rotated simultaneously (horn antennae crossed (i.e., perpendicular)). For a quarter-waveplate, the expected angular dependencies are $$t_{//} = \sqrt{\cos^4\theta + \sin^4\theta} \quad (6)$$

and $$t_\perp = \frac{1}{\sqrt{2}}\sqrt{\sin(2\theta)} \quad (7)$$

for the normalized transmitted field amplitudes in the parallel and perpendicular configurations, respectively, where $\theta$ is the receiver horn angle (defined to be zero when oriented in the direction of a TM polarization). On the other hand, for a half-waveplate, the expected angular dependencies are $$T_{//}=\cos^2(2\theta) \quad (8)$$

and $$T_\perp=\sin^2(2\theta) \quad (9)$$

for the normalized power transmission in the parallel and perpendicular configurations, respectively.

Figure 5B:
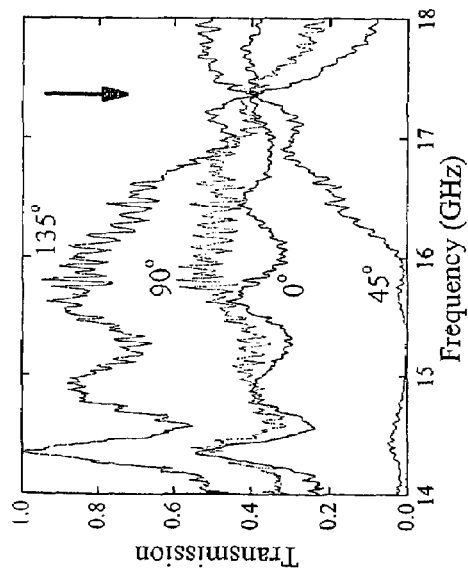
FIG. 5B is a graphical representation of experimentally measured, normalized field (amplitude) transmission versus rotation angle for a hexagonal-lattice, photonic crystal quarter-waveplate (horns aligned—filled squares, horns crossed—open circles)
Figure 5C:
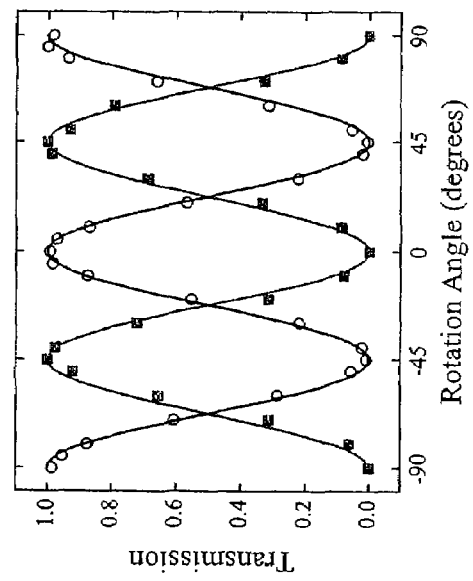
FIG. 5C is a graphical representation of experimentally measured, normalized intensity (power) transmission versus rotation angle for a hexagonal-lattice, photonic crystal half-waveplate (horns aligned—open circles, horns crossed—filled squares)

For both quarter- and half-waveplates, the measured results at the waveplate frequencies agree very well with the expected angular dependencies for the corresponding waveplates (see FIGS. 5B and 5C). For the quarter-waveplate, the data was obtained by measuring the normalized field transmission at approximately 17.4 GHz; for the half-waveplate, the normalized intensity transmission was averaged over 15–15.5 GHz. These results clearly show, for the first time, the successful design and operation of compact, photonic-crystal waveplates.

Figure 6A:
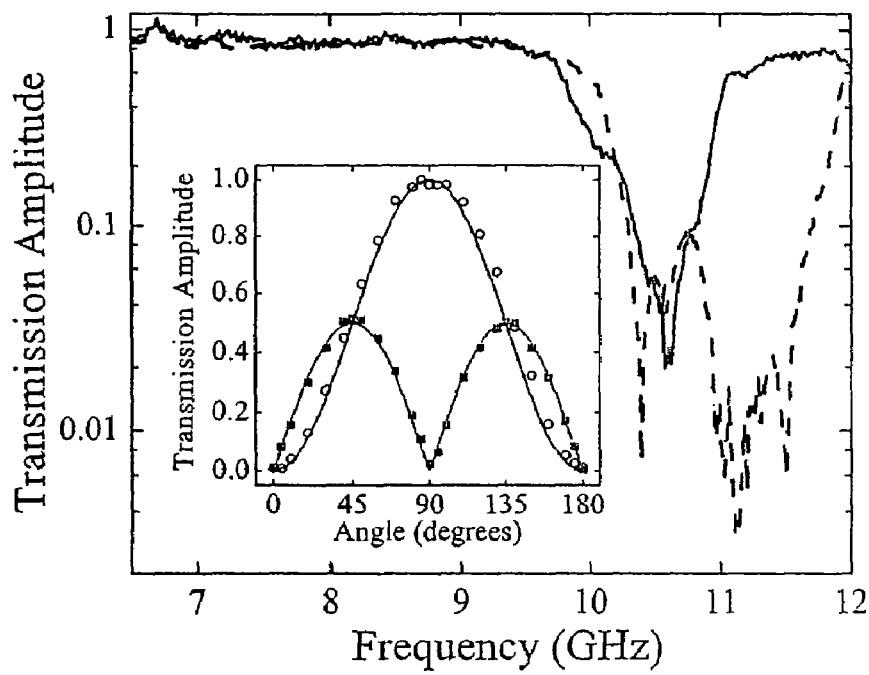
FIGS. 6A and 6B are graphical representations of experimentally measured normalized field (amplitude) transmission through a 20-layer, hexagonal-lattice photonic crystal over specified frequency ranges (horns aligned—open circles, horns crossed—filled squares)
Figure 6B:
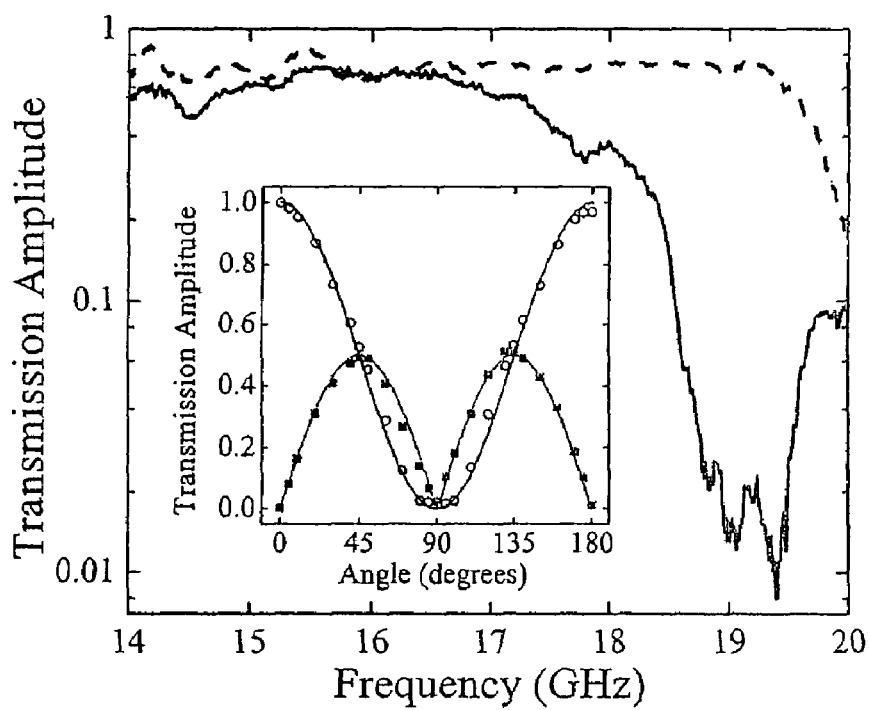

Experimental verification of the use of a photonic crystal as a polarizer or polarizing beamsplitter is also described herein. Using the same experimental setup described above, the transmission through a 20-layer, hexagonal-lattice crystal was measured with the horn antennae parallel and perpendicular (as a function of receiver horn angle) at a fixed frequency within the band gap of one polarization, but in the transparent region of the other. The results of this trial are shown in FIG. 6A for the fundamental band gap. This experiment was also performed utilizing the next order band gap of the structure (see FIG. 6B). The main portions of these figures show the field transmission profiles of the crystal and the insets show the results of the horn rotation operations at roughly 11.4 GHz (a) and 19.2 GHz (b). In both cases, the experimental results agree quite well with the expected angular dependencies for these operations.

Higher order band gaps occur at multiples of the fundamental band gap frequency. In addition, other band gaps exist at frequencies higher than that of the fundamental. Since band gaps at higher frequencies can be wider and/or deeper than the fundamental band gap, it is possible for the operation of a photonic crystal polarizer to be more effective at higher frequency; thus, at fixed frequencies, it may be advantageous to scale down the crystal in size to utilize higher order band gaps. Since the photonic crystal polarizer reflects the light that is not transmitted, the reflected polarization can be utilized, as well. These results clearly show directly, for the first time, the successful operation of a photonic crystal polarizer/polarizing beamsplitter.

Photonic Crystal Reflection Waveplate

Another useful property for polarization control is the polarization-dependent phase shift acquired upon reflection from a photonic crystal. A polarization-dependent phase shift may be acquired upon reflection from (or transmission through) a photonic crystal even at normal incidence if the crystal is periodic in more than one dimension. For example, in a crystal with two-dimensional (2D) periodicity, the Fresnel coefficients for the two basis polarizations may be different at each material interface, and the cumulative effect of many curved interfaces leads to a polarization-dependent band structure. These polarization-dependent effects can also occur for light obliquely incident on a one-dimensional (1D) crystal.

A photonic-crystal-based reflection waveplate can be constructed completely from dielectric materials (although other components are not precluded) and it does not require external mirrors or additional optical elements. The reflective and polarization-dependent properties of a photonic crystal can be tailored by changing the lattice geometry, material composition, utilizing higher order band gaps, and changing the incident angle of the radiation; thus, photonic crystal waveplates (both reflection and transmission) can be adapted for use in many possible polarization-control applications. Furthermore, they can be used at any wavelength scale simply by applying the appropriate scaling. An experimental proof-of-principle demonstration is presented here.

For a practical reflection waveplate, this polarization-dependent phase delay is most interesting in spectral regions of high reflectivity, i.e., where both polarizations are almost completely reflected. The physics behind a polarization-dependent phase shift is again based on the cumulative effect of the complex Fresnel coefficients at each curved material interface; however, in the band gap portion of the spectrum, material interfaces deeper into the crystal contribute increasingly less phase shift to the reflected wave because the field is exponentially attenuated within the crystal.

Unfortunately, knowledge of the phase delay of a transmitted wave in transparent spectral regions cannot be used to determine the phase of the reflected component in the is band gap. Thus, the phase delay experienced by reflected waves in the band gap remains an open question, despite phase measurements of photonic crystal transmission. Here it is demonstrated that the relative phase between the two basis polarizations acquired upon reflection from a 2D photonic crystal can be significant in spectral regions of very high reflectivity. This property is applied to the construction of a microwave-scale, reflection quarter-waveplate based on the 2D, square-lattice geometry and its operation is demonstrated. Since the properties of photonic crystals are based on the physics of Maxwell's equations with boundary conditions, the results presented here are scale-invariant and apply across the electromagnetic spectrum.

Figure 8:
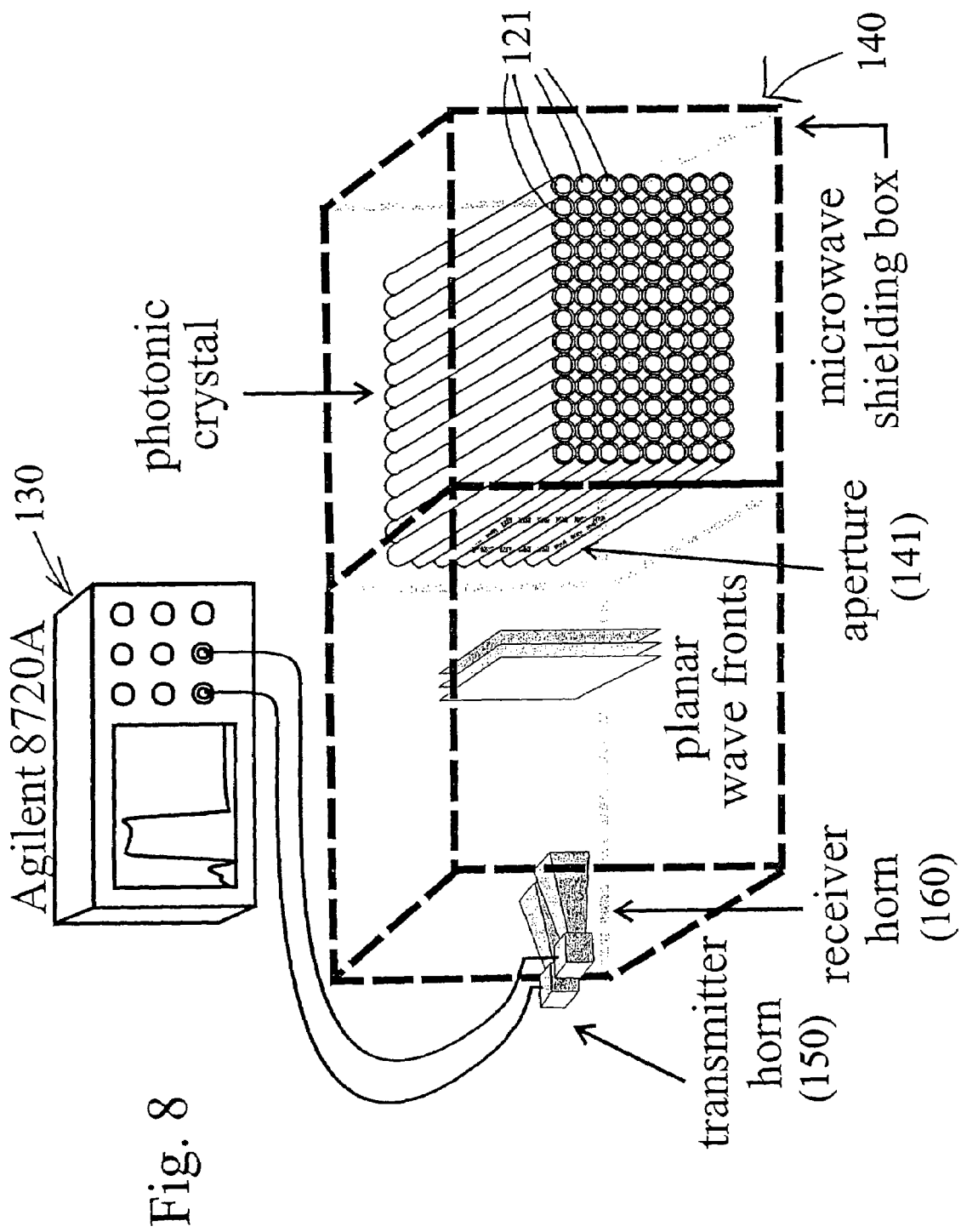
FIG. 8 is a schematic representation of an experimental setup for conducting a variety of photonic crystal experiments.

The crystals were constructed, as shown schematically in FIG. 8, by stacking acrylic (index of refraction 1.61) pipes 121 in an array of the desired geometry (e.g., square lattice) and cementing them together with an acrylic solvent. The crystal used for this experimental demonstration was a bulk (i.e., the length of the extruded dimension was much longer than a lattice constant), 30-layer, square-lattice structure, with a lattice constant of ½ inch, and an air-filling fraction (AFF) of 0.66. The square-lattice arrangement is shown in FIG. 8, forming photonic crystal 120.

Figure 9:
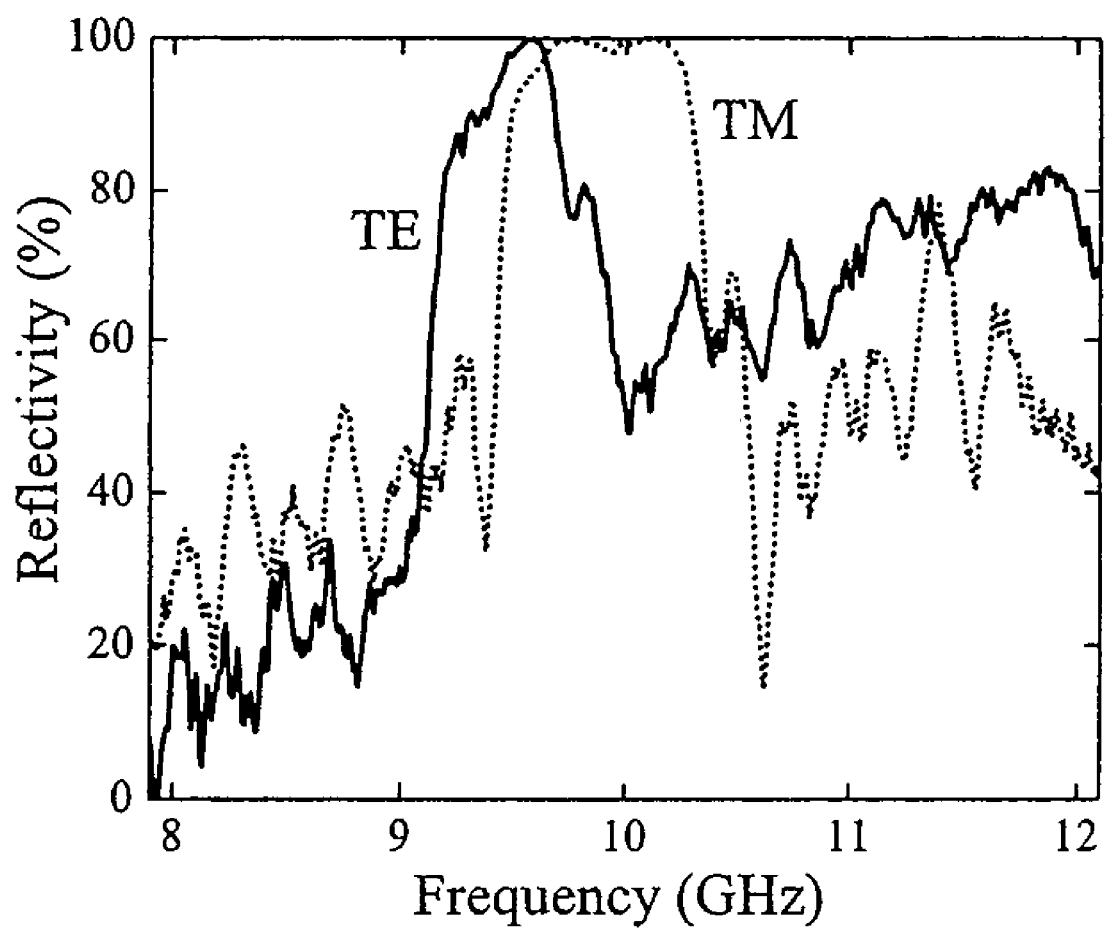
FIG. 9 is a graphical representation of normalized intensity (power) reflectivity in the vicinity of the fundamental band gaps of a 30-layer, square-lattice photonic crystal.

Transmission measurements of the fundamental band gaps of this crystal were made with a Hewlett-Packard vector network analyzer (VNA) using the methods previously described. Radiation was coupled to and from free space with microwave gain-horn antennae. The crystal was placed in a shielded box with an aperture smaller than the cross-section of the crystal. The shielded box was placed in the far-field of the transmitter horn, and the receiver horn was positioned directly behind the crystal inside the box. The aperture and positioning were used to eliminate edge effects from the crystal, and to ensure that the microwaves incident on the crystal would be effectively plane waves. The horn antennae are sensitive to only a single linear polarization; thus, it was possible to measure the phase delay as a function of frequency for microwaves propagating in the periodic plane of the crystal, with both TM and TE linear polarizations (we label the polarizations with respect to the periodic plane: the transverse magnetic (TM) and transverse electric (TE) polarizations are parallel and perpendicular to the periodic plane, respectively (see FIG. 1). Since the crystal is non-absorbing, a transmission measurement suffices to show the power reflectivity of the crystal. The experimentally measured power reflectivity of the crystal as a function of frequency in the vicinity of the fundamental band gaps is shown in FIG. 9. From these transmission measurements, we find that the 30-layer crystal exhibits greater than or equal to 95% power reflectivity for both TM and TE polarizations over roughly a 100 MHz overlap range centered near 9.6 GHz.

Reflection measurements were also made using the experimental setup presented in FIG. 8. Microwaves were coupled between the vector network analyzer (VNA) 130 to and from free space with polarization sensitive horn antennae. Transmitter 150 and receiver 160 horns were mounted together on a rotation stage inside a microwave-shielded box 140, internally lined with microwave absorbing material (Eccosorb). The crystal was placed in the far-field of these horns, behind an aperture 141 smaller than the cross-section of the crystal 120. Waves emitted from the transmitter horn 150 were incident on the crystal and retro-reflected back to the receiver horn 160 juxtaposed with the transmitter. The rotation stage allowed the horns to be rotated simultaneously in the plane parallel to the incident face of the crystal. The horns could be mounted with their antennae either parallel or crossed to emit and detect either parallel or orthogonal polarizations, respectively. The reflection measurements show that the phase difference between TM and TE polarizations upon reflection from this crystal is approximately 90° over a continuous span of roughly 100 MHz just below 9.6 GHz (see FIG. 10). These data suggest that this photonic crystal can be used as a reflective quarter-waveplate with high reflectivity in the spectral region where its band gaps overlap.

Figure 11:
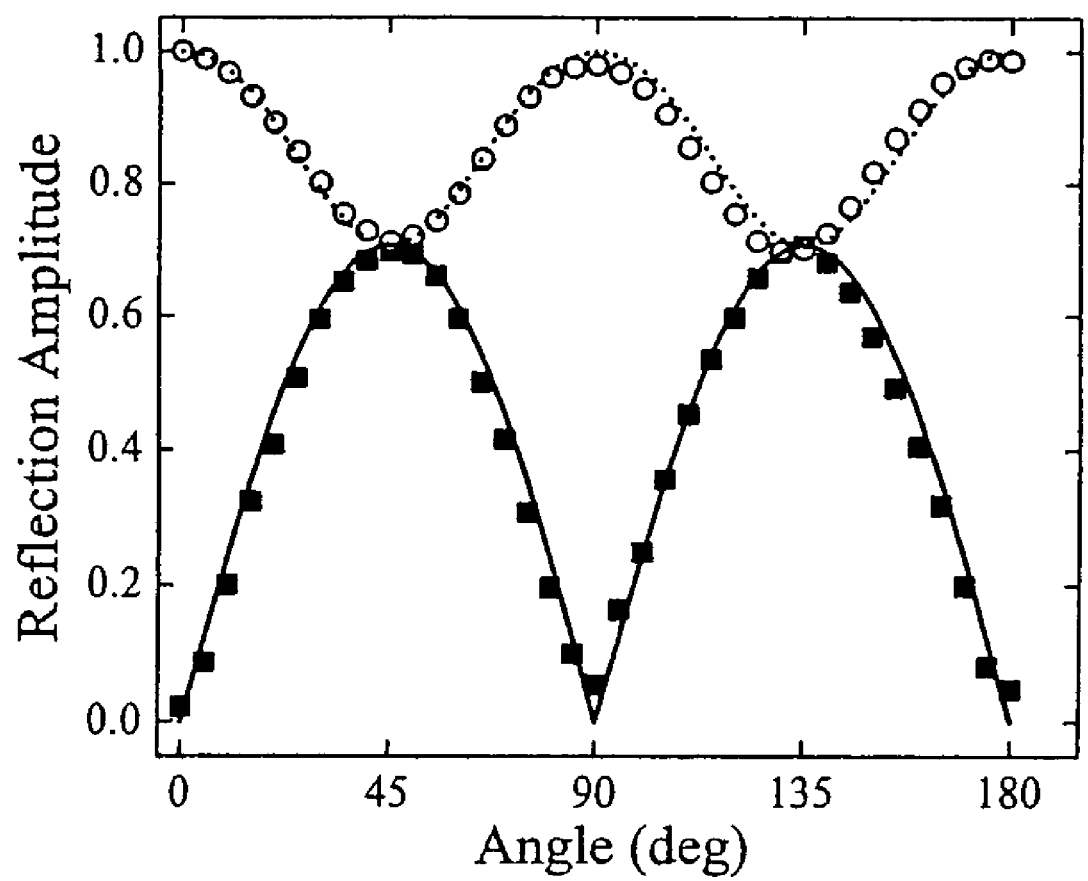
FIG. 11 is a graphical representation of the experimentally measured reflected field (amplitude) versus receiver horn angle (open circles represent horns aligned, and solid squares represent horns crossed); these results were achieved using a 30-layer, bulk, square-lattice photonic crystal at approximately 9.56 GHz, ideal quarter-waveplate curves are shown in dotted (horns aligned) and solid (horns crossed) lines.

This hypothesis was confirmed with direct reflection measurements showing the behavior of a quarter waveplate. FIG. 11 shows the experimentally measured field reflection from the 30-layer square lattice crystal, at a fixed frequency just below 9.6 GHz, as a function of transmitter horn angle with the horns parallel (open circles) and crossed (filled squares). The data were obtained from raw measurements as follows: the results of multiple measurements at the same angle were averaged to wash out alignment uncertainties in the crystal and horns (system was realigned from scratch for each measurement); an offset was added to the points belonging to the horns parallel data set, and a normalization factor was applied to the horns crossed data set. The offset and normalization factor were used to bring the data sets to their expected maxima, and were needed because of the inherent difficulties in calibrating free-space microwave reflection measurements to an absolute amplitude scale. The resulting data sets agree very well with the expected theoretical curves also shown in FIG. 11.

In addition to the square lattice, some other bulk structures were also constructed and tested. However, for these other structures, the maximum phase difference between reflected TM and TE polarizations was observed to be less than 90° over nearly all of the overlap region of the fundamental band gaps. These results stress the importance of the lattice properties in the design of photonic crystal devices for polarization control.

In the experiments discussed here, normally incident radiation was considered, although other angles of incidence are also permissible. For non-normal incidence, however, the waveplate will have a modified frequency range of operation. If the incident beam is obliquely incident on the crystal, the angle of the reflected beam will be determined by the angle of incidence. Thus, in principle, the angle between the incident and the reflected beam can be anything from 0° to 180°. In addition, shifts in incidence angle are known to shift band gap position, and should modify phase-dependent properties, providing another degree of freedom to tailor the properties of the waveplate.

These experiments utilized the fundamental band gaps of the photonic crystal. Higher order band gaps occur at integer multiples of the fundamental band gap frequency. Since higher frequency band gaps can be wider and deeper, reflection waveplates operating in these higher order gaps can potentially have greater reflectivity and bandwidth.

Figure 10:
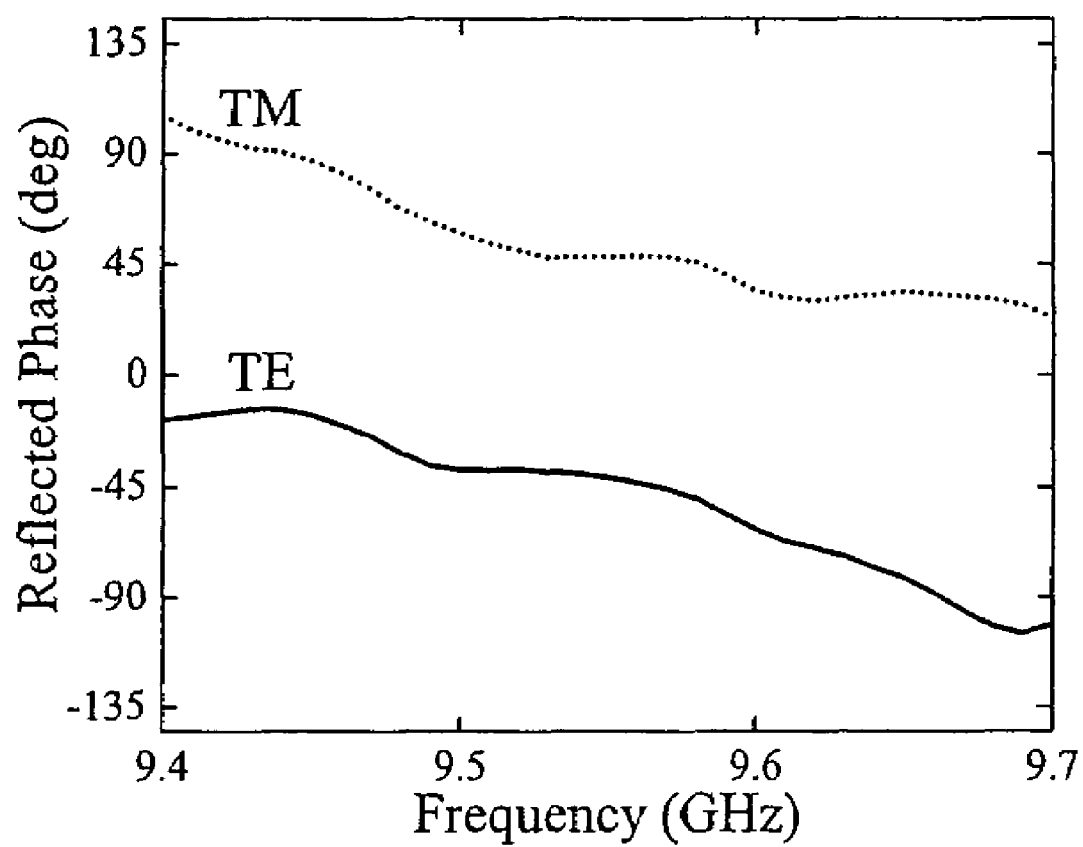
FIG. 10 is a graphical representation of the experimentally measured phase of waves reflected from a 30-layer, bulk, square-lattice photonic crystal (lattice constant ½ inch, air-filling fraction [AFF] 0.66) in the vicinity of the fundamental band gaps as a function of frequency.

In conclusion, this is a proof-of-principle experimental demonstration of an all-dielectric, reflection waveplate based on a photonic crystal. It is possible to tailor the properties and improve the characteristics of these waveplates by modifying lattice geometry, material composition, filling fractions, angle of incidence, and utilizing higher-order band gaps. If the incident radiation is normally incident on the face of the crystal, it is retro-reflected; however, if the incident beam is obliquely incident on the crystal, the angle of the reflected beam is determined by the angle of incidence. Thus, in principle, the angle between the incident and the reflected beam can be anything from 0° to 180°. Finally, as seen in FIG. 10, the TM-TE phase difference can well exceed 90°, indicating that reflection quarter-waveplates are not a limiting case; with certain crystal configurations, reflection half-waveplates should also be possible. Dielectric, reflection waveplates may have important practical applications, particularly in optics, where compact, designable polarization control is desirable for integrated, photonic devices.

A Wide-Band (Achromatic) Photonic Crystal Transmission Waveplate

A wide-band (achromatic) transmission waveplate can be constructed if the photonic crystal is designed such that the desired operating wavelength is larger than that of the fundamental band gaps. In this spectral region, the crystal is transparent, and the birefringence does not change significantly with frequency. These types of waveplates can be much more compact than conventional wide-band polarization control devices, and their specific dispersive properties and bandwidth can be tailored by modifying the crystal geometry and material composition. The principles behind polarization control with photonic crystals can be applied at any wavelength simply by applying the appropriate scaling. These devices have many potential applications; for example, they should provide highly integrable polarization control in optical photonic circuits. Polarization-dependent effects in the achromatic photonic crystal transmission waveplate can also be understood in terms of the cumulative effect of polarization-dependent Fresnel coefficients at each material interface. However, in spectral regions well below the fundamental band gap, the effective indices of refraction are non-dispersive (i.e., not frequency-dependent). This property can be qualitatively understood by considering the Kramers-Kronig relations applied to the transmission model previously presented (FIG. 7). From this simple model, there is a clear birefringence that becomes relatively non-dispersive at low frequency.

Figure 12:
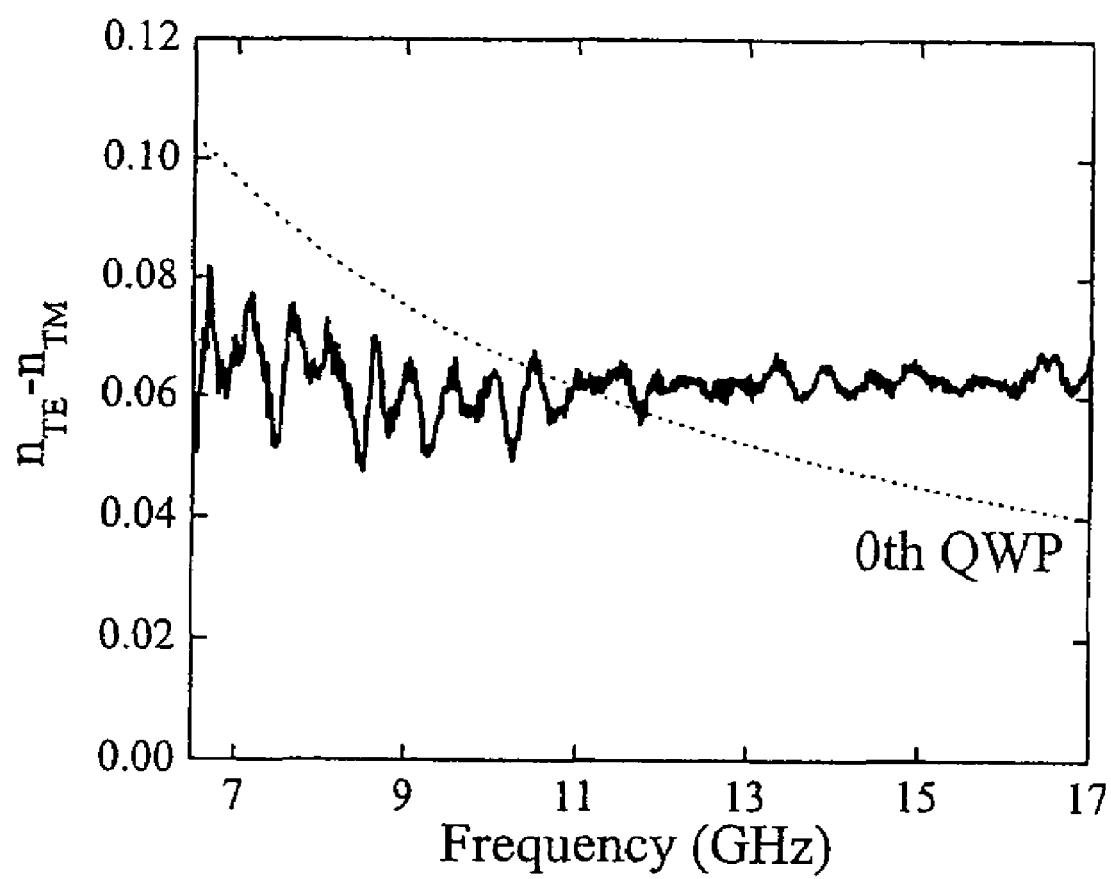
FIG. 12 is a graphical representation of the experimentally measured difference between the TE and TM indices of refraction for a 20-layer, bulk, hexagonal-lattice photonic crystal (lattice constant ¼ inch, air-filling fraction [AFF] 0.32) well below the fundamental band gaps; also shown as a dotted line is the $0^{th}$ order quarter waveplate condition.

Experimental evidence for the birefringent behavior characteristic of a wide-band waveplate is also presented here. The crystal used was a bulk, hexagonal-lattice structure composed of stacked acrylic pipes (lattice constant ¼ inch, AFF=0.32). The data presented were collected using the experimental transmission setup described above. FIG. 12 shows representative results for the experimentally measured birefringence between TM and TE waves transmitted through a 20-layer crystal. Experiments show that crystals with different (even) numbers of layers exhibit similar birefringences, but different phase retardances owing to the different path lengths. As expected, the birefringence is essentially constant over measured interval. This fact is dramatic considering that the interval covers a large frequency range: the ratio of the maximum to minimum frequency is more than 2.5. Furthermore, the size of this interval was only limited by the frequency range of the measurement apparatus. Also shown in FIG. 12, is the quarter-waveplate condition, illustrating that this crystal acts as a quarter-waveplate with a scaled useful bandwidth comparable to standard, commercial, zero-order waveplates for optical wavelengths.

Although the measured birefringence is nearly linear, it evident from the data that it has local frequency variations or wiggles that become more pronounced at wavelengths that are larger compared with the lattice spacing. At first glance, these variations may seem to be measurement noise; however, using a simple 1D-photonic-crystal model, it can be shown that they are in fact an inherent property of photonic crystals. Although 1D photonic crystals are not birefringent at normal incidence, it is still useful to study their dispersive properties from their effective or geometrical index of refraction (calculated from the transmitted phase). This model displays nontrivial features, many of which can be applied, at least qualitatively, to the design of birefringent, 2D structures.

Figure 13:
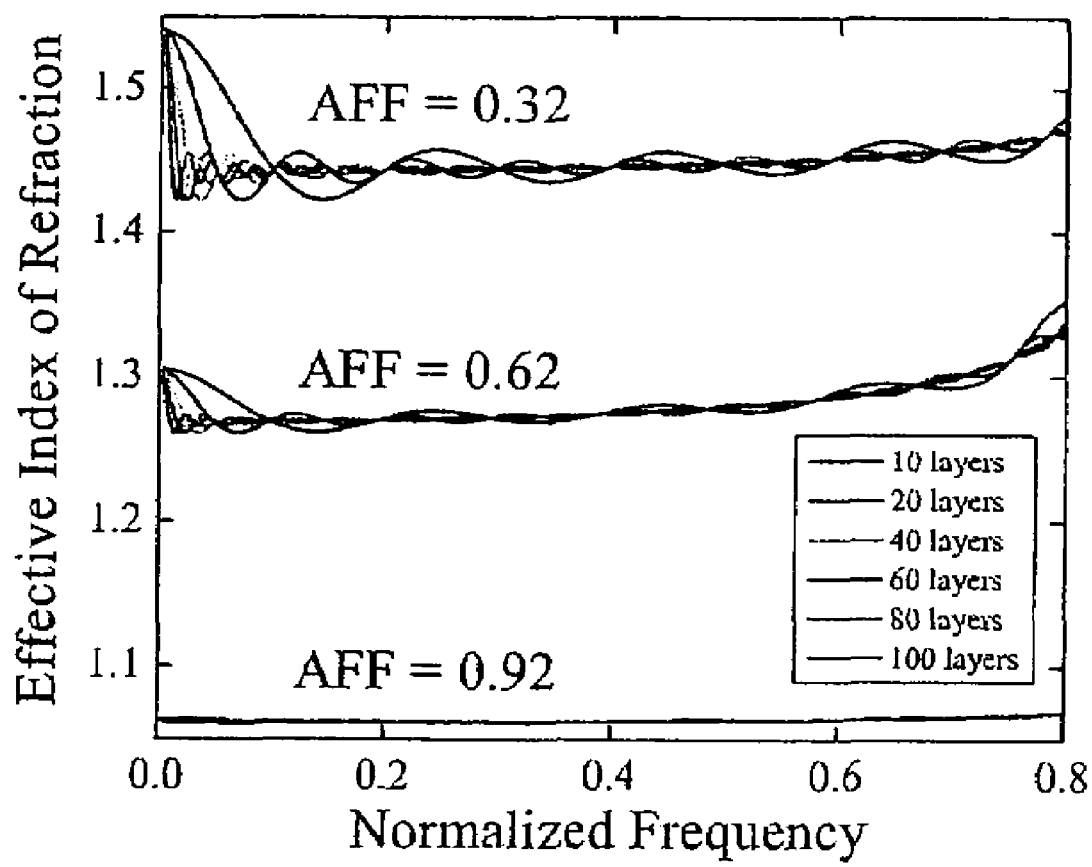
FIG. 13 is a graphical representation of the calculated effective indices of refraction for 10-, 20-, 40-, 60-, 80-, and 100-layer, one-dimensional (1D), acrylic-air, dielectric stacks of the indicated air-filling fractions (AFFs); the 0.62 AFF stack is a quarter-wave stack while the other two were created by both reducing the air layer thickness and increasing the acrylic layer thickness, or vice versa; the calculations were performed with the transfer matrix method for dielectric slabs.

FIG. 13 shows the calculated effective indices of refraction below the fundamental band gap of three different 1D, acrylic-air stacks of 20, 40, 60, 80, and 100 layers (plotted as a function of frequency, normalized to the central frequency of the fundamental band gap of each structure). One stack consisted of quarter-wave layers, and thus had an AFF of roughly 0.62. By reducing the thickness of the air layer and increasing that of the acrylic layer by the same amount, or vice versa, stacks of two other AFFs (0.32 and 0.92) were created. For simplicity, the raw materials were assumed to have zero intrinsic dispersion. These calculations show several interesting features. First of all, we see that the indices of refraction are flat overall, but begin to increase as the band gap is approached; however, the slope of the increase near the gap apparently depends on the AFF, with the quarter-wave stack showing a greater slope than the other two. Since the quarter-wave stack has the widest, deepest band gap of the three structures, the band gap width and depth are evidently important features for the dispersion at higher frequencies. Secondly, it is clear that this model exhibits local frequency variations in the index of refraction, which were also seen in the experimental data of FIG. 12. As seen in the experimental data, the amplitude of these variations becomes more pronounced at lower frequency, but the amplitude is reduced and the rapidity increased as more layers are added. In addition, the variations show a clear correlation with AFF, becoming less significant as the AFF is increased.

These calculations suggest that photonic crystal waveplates are highly engineerable devices. Furthermore, the local variations in the indices of refraction can be exploited to create a waveplate in which the relative phase retardance is virtually frequency-independent over some frequency range. In particular, the variations exhibit anomalous dispersion (i.e., over some frequencies, the index of refraction decreases with increasing frequency); if the birefringence is designed to decrease as roughly as $\omega^{-1}$ (or nearly so) over some interval, the phase retardance will be constant over that range.

It has been shown here that it is possible to control the polarization of EM waves propagating in the plane of periodicity of a two-dimensional (2D) photonic crystal (i.e., photonic crystals periodic in two dimensions). The principles of polarization control with photonic crystals described here are also valid for other classes of anisotropic photonic crystals; for example, three-dimensional (3D) photonic crystals (i.e., photonic crystals periodic in three dimensions) can also have the polarization-dependent boundary conditions necessary for polarization control.

Nonlinear Optical Frequency Generation with a Photonic Crystal

Nonlinear optical crystals can be used to generate new frequency components from input light beams. In such interactions, phase-matching conditions must be satisfied for efficient conversion to take place. This is usually accomplished by angle tuning birefringent crystals to create the correct indices of refraction for ordinary and extraordinary rays involved in the nonlinear mixing process in order to phase-match. However, the drawback of this method is the walk-off or divergence of the ordinary and extraordinary waves as they propagate through the crystal, an effect that limits the efficiency of the nonlinear mixing process. If instead, a birefringent photonic crystal composed of material with the correct optical nonlinearity is used as the nonlinear optical medium, the birefringence can be designed to satisfy the phase-matching conditions at the desired frequencies by tailoring the lattice geometry and size, and the material proportions and composition. Then, phase matching can be achieved without the need for angle tuning, increasing the efficiency of the nonlinear mixing process. On the other hand, it may also be possible to achieve phase matching for waves of a single polarization by combining the effects of material and geometrical dispersion.

Birefringent photonic crystals composed of material with optical nonlinearity can be designed to increase the efficiency of nonlinear mixing processes. As a specific example, consider $\chi^{(2)}$ processes, which can occur in non-centrosymmetric crystals. In this type of process, it is possible to produce sum-frequency, second-harmonic, and difference-frequency (parametric amplification) generation.

In order for efficient conversion to take place, conservation of momentum between the waves involved in the nonlinear mixing process must be satisfied. In particular, the nonlinear mixing process is efficient if the wavevector mismatch $\Delta k$ is zero. Stated another way, the waves must have the correct relative phasing in order for energy to be efficiently extracted from the input beam. This condition is known as phase matching. For example, in the nonlinear process of second-harmonic generation, an input beam with wavevector $k_1$ and frequency $\omega_1$ can be converted to an output beam with wavevector $k_2$ and frequency $\omega_2=2\omega_1$; in this situation, the phase matching condition is $\Delta k=2k_1-k_2=0$ for collinear beams. This condition is equivalent to the requirement $n(\omega_1)=n(2\omega_1)$ where $\omega_1$ is the frequency of the fundamental harmonic and $n(\omega)$ is the frequency-dependent index of refraction of the optical medium. For collinear $m^{th}$ harmonic generation (for positive integer m>1), wherein an input beam at frequency $\omega_1$ is converted to an ouput beam at frequency $m\omega_1$ in a medium with $\chi^{(n)}$ nonlinearity, phase matching requires $\Delta k=mk_1-k_2=0$, which is equivalent to $n(\omega_1)=n(m\omega_1)$.

For many nonlinear wave mixing processes, this phase matching is normally achieved in the prior art by angle tuning a birefringent nonlinear medium. For example, in second harmonic generation, the angle of the medium is adjusted such that an ordinary polarized wave of the fundamental harmonic and an extraordinary wave of the second harmonic (or vice versa) satisfy this condition. This is possible because the index of refraction for extraordinary polarized waves is a function of the angle ($\theta$) of propagation relative to the optic axis of the medium. However, the Poynting vectors (i.e., the direction of energy transport) of the ordinary and extraordinary rays will not be parallel whenever the extraordinary ray propagates at an angle that is not $\theta=0°$ or $\theta=90°$ relative to the optic axis. As a result, the spatial overlap of the ordinary and extraordinary polarized beams will be reduced, decreasing the efficiency of the nonlinear process, whenever $\theta$ is not 0° or 90°. A birefringent photonic crystal composed of material with the $\chi^{(2)}$ optical nonlinearity can be designed so that the ordinary and extraordinary waves satisfy this condition at $\theta=0°$ or $\theta=90°$, eliminating the walk-off of the ordinary and extraordinary waves.

Furthermore, many materials with $\chi^{(2)}$ nonlinearity are not intrinsically birefringent, preventing them from being used in any phase-matching schemes that require birefringence. However, a birefringent, photonic crystal structure can be constructed using these materials; as described above, a photonic crystal can be birefringent due to its geometrical properties, even though the component materials may have no intrinsic birefringence. Thus, such a nonlinear material can be used in birefringent phase-matching schemes if it is a component in a birefringent photonic crystal, even if the material has no intrinsic birefringence.

In some cases, another established process known as temperature tuning can be used to achieve phase matching for ordinary and extraordinary rays without deviating from $\theta=0°$ or $\theta=90°$. This scheme exploits the temperature dependence of the birefringence of certain crystals. However, use of a birefringent photonic crystal provides a novel alternative, which may be especially useful for nonlinear media whose birefringence is not significantly temperature dependent.

On the other hand, photonic crystals can also offer another method of phase matching which does not rely on any birefringence at all. Usually, normal dispersion prevents the phase matching condition from being satisfied for two waves of the same polarization since they are at very different frequencies. However, the structural and compositional properties of photonic crystals produce an effective geometrical index of refraction. The dispersive properties of this geometrical index can be tailored by tuning to different frequencies above or below the band gaps of the media. Thus, for example, it is possible to achieve phase matching for second-harmonic generation by designing a structure for which material dispersion and geometrical dispersion cancel or combine in the right way to make $n(\omega_1)=n(2\omega_1)$.

Second-harmonic generation provides an example of the utility of a photonic crystal for increasing the efficiency of a nonlinear optical mixing process; however, it is not a limiting case—the birefringent and/or dispersive properties of photonic crystals can be tailored to suit other nonlinear optical mixing processes as well.

Figure 14:
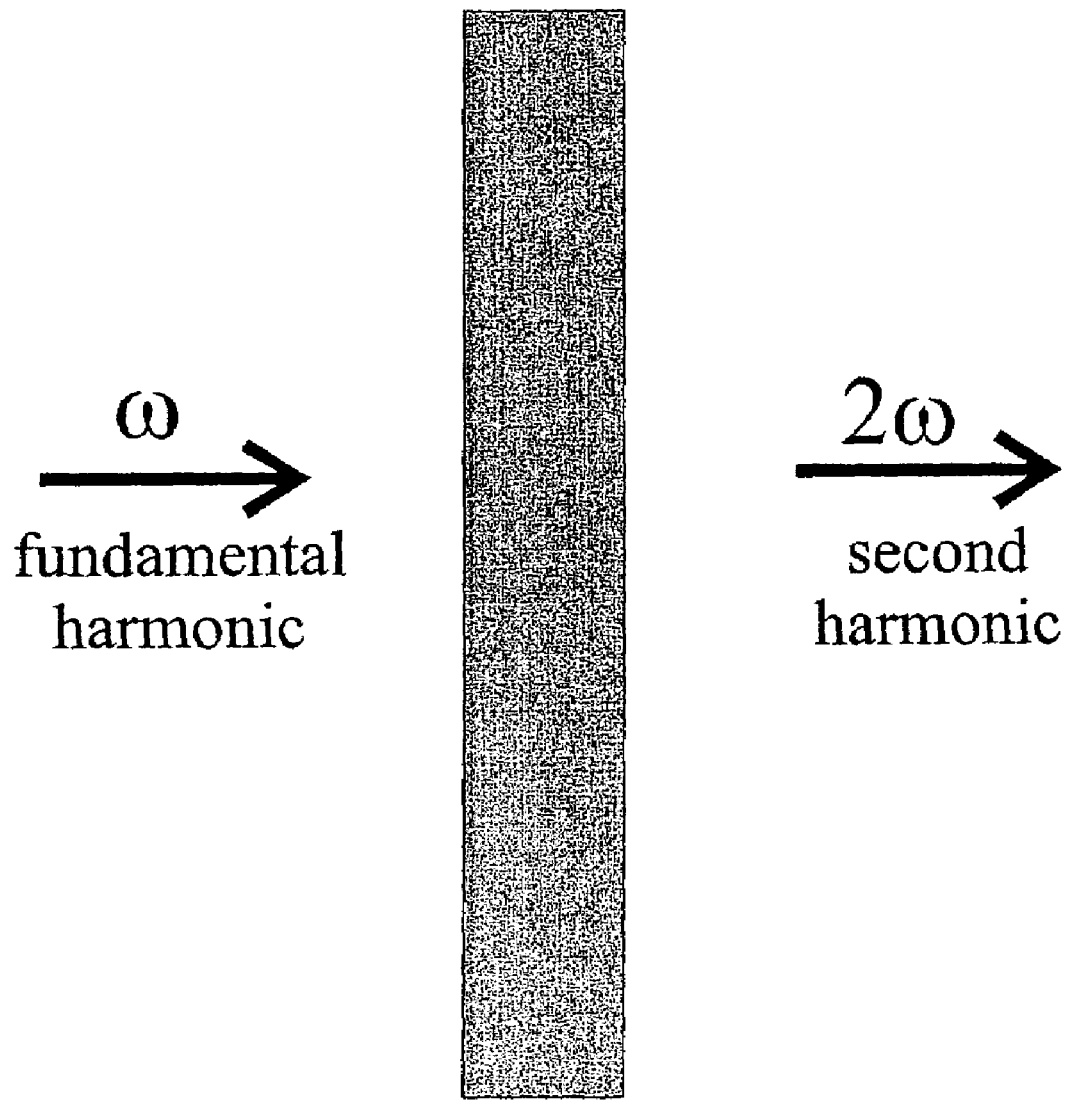
FIG. 14 is a schematic representation of a nonlinear photonic crystal used for second harmonic generation.

FIG. 14 shows a schematic of a nonlinear photonic crystal used for second harmonic generation.

Delay Lines

An experimental and theoretical study of a simple, passive system consisting of a birefringent, two-dimensional photonic crystal and a polarizer in series is presented. It is shown that fast and slow group velocities can arise even though no incident radiation is absorbed or reflected. This type of system is an example of a new, broad class of systems that can be used as delay lines for electromagnetic waves and electronic signals; the central characteristic of these systems is a coupling between two or more modes. A vector formulation of the Kramers-Kronig dispersion relations facilitates an understanding of these counter-intuitive effects.

Superluminal group velocities have been observed in a number of different physical systems. These include passive absorptive, passive reflective, and active transparent media. Here the first discussion and experimental observation of superluminal effects in a passive system with neither absorption nor reflection is presented. The effects arise because of a transfer of energy or interference between two modes of the electromagnetic field, in this case two different polarizations of light. These results can be interpreted using a new vector formulation of the Kramers-Kronig relations. Using this formalism, it is clear that these arguments can be applied to any systems (both passive and active) in which energy can be transferred between two or more modes.

It is widely believed that the Kramers-Kronig (K—K) relations require that passive systems be either absorptive or reflective in order to exhibit superluminal effects. However, this is not the case; while absorptive and reflective systems are required to have spectral regions of anomalous dispersion, the converse is not necessarily true. In fact, the exchange of energy between modes is a sufficient condition for anomalous dispersion in any system. These effects are consistent with causality.

These effects can be observed in a broad range of systems. As a specific example, consider an experimental system consisting of a slab of highly birefringent, 2D photonic crystal and a linear polarizer, placed in series. The role of the photonic crystal here is its large, frequency-dependent birefringence in transparent spectral regions; however, a conventional birefringent material could potentially be used instead. The results presented here were obtained using a photonic crystal with fundamental and second-order photonic band gaps in the regions of 10 and 20 GHz, and displaying strong birefringence with very high transmission in the frequency range between the two gaps. The crystal itself was a bulk, 18-layer, hexagonal-lattice array of hollow acrylic rods (outer diameter ½") with an air-filling fraction (AFF) of 0.60.

The transmission and dispersive properties of this system between the two band gaps were studied using a Hewlett-Packard vector network analyzer (VNA). Microwaves were coupled to and from free space with polarization-sensitive horn antennae. The photonic crystal was placed in the far-field of the transmitter horn to ensure that planar wavefronts of a well-defined polarization were incident on it. The receiver horn was positioned immediately behind the photonic crystal on a direct line of sight with the transmitter horn. In addition, the crystal and receiver horn were placed inside a microwave-shielded box with an open square aperture, whose size was chosen to minimize diffraction effects while eliminating signal leakage around the crystal.

Figure 15:
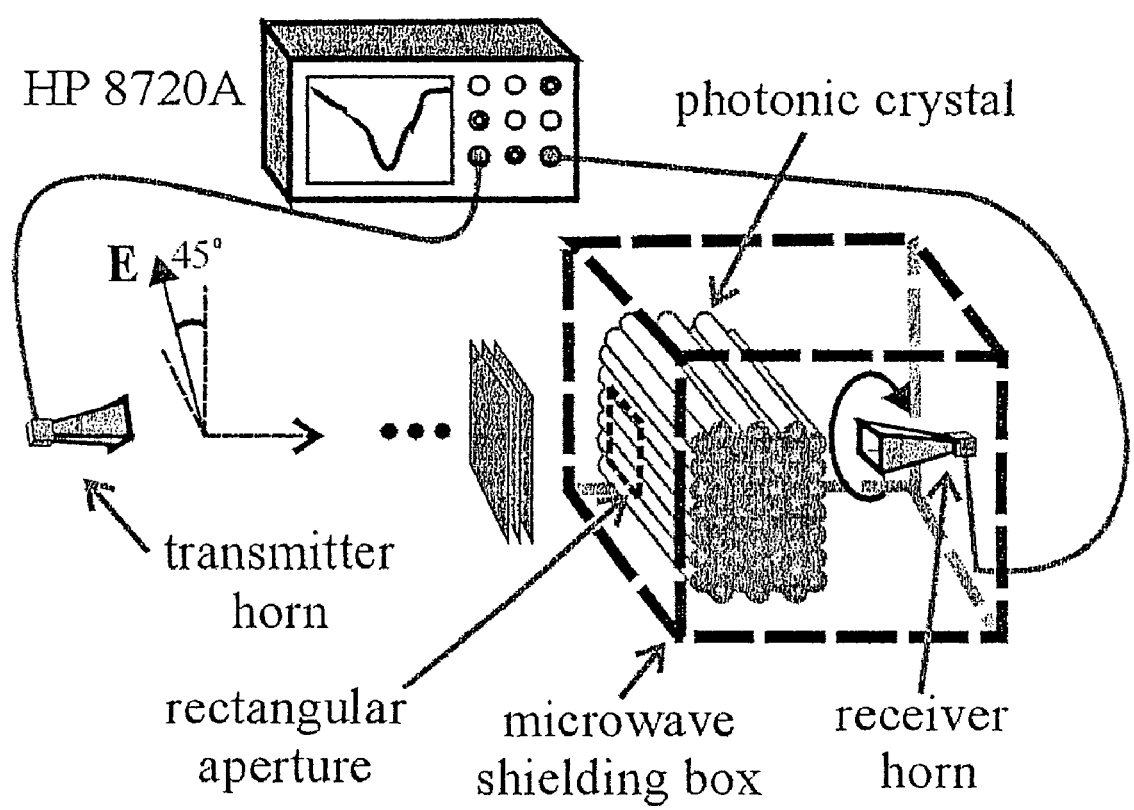
FIG. 15 is a schematic representation of an experimental setup for demonstrating a photonic-crystal-based, mode-interference delay line.
Figure 16A:
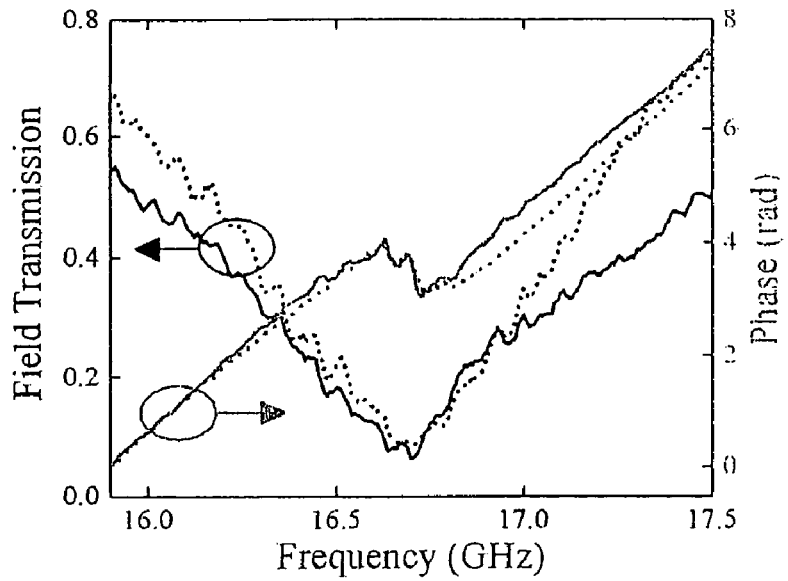
FIGS. 16A and 16B are graphic representations showing calculated (dotted lines) and experimentally measured (solid lines) transmission on the vertical axis and phase shown on the horizontal axis for the detected polarization inclined at 40° in FIG. 16A and inclined at 50° in FIG. 16B.
Figure 16B:
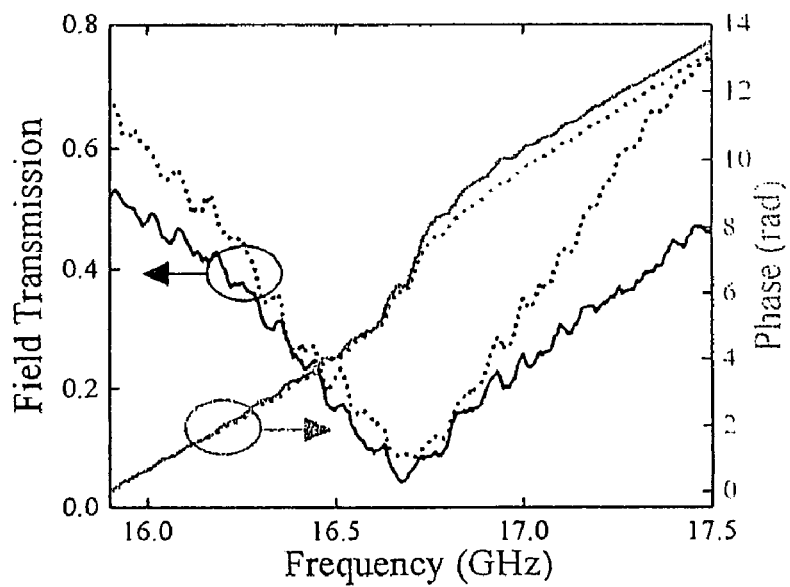

In order to control the polarizations of the incident and detected fields relative to the fast axis of the crystal, the transmitter and receiver horns were mounted on precision rotation stages. The angle of the incident polarization θ was held fixed at 45° relative to the fast axis of the crystal, while the angle of the receiver horn β was allowed to vary. The coordinates are defined such that the slab is oriented with its fast axis parallel to the vertical direction, and label the incident polarizations TM (transverse magnetic) and TE (transverse electric) for polarizations parallel and perpendicular to the fast axis, respectively. The experimental setup is displayed in FIG. 15. The transmission amplitude and phase measurements with the receiver horn set at 40° and 50° are shown in FIGS. 16A and 16B, respectively; calculated (dotted lines) and measured (solid lines) transmission (left axis) and phase (right axis) for the detected polarization inclined at (a) 40° and (b) 50° are shown. Since the spectral region shown is far from the band gaps, the observed transmission dip is not due to any band gap effect. It is caused by the fact that the photonic crystal rotates the polarization of the light by adding a different frequency-dependent phase to each polarization component. For β<45° there is clear anomalous dispersion in the vicinity of 16.5–17 GHz (the half-waveplate frequency for the photonic crystal) while for β>45° the dispersion is normal. A remarkable feature of this data is that while the transmission is identical for both β=40° and β=50°, aside from experimental errors, the phase properties are quite different. These features can be explained using a physical model that is developed below.

A linear system that is invariant under time translation and is described by a scalar response (Green's) function g(t) produces a time-dependent response b(t) to an input a(t) given by the convolution $$b(t) = \int_{-\infty}^{\infty} g(t-\tau)a(\tau)d\tau.$$

This expression is the starting point for the usual derivation of the Kramers-Kronig relations. The present system, however, accepts a time-dependent vector input and produces a vector output. The scalar convolution must therefore be replaced with the expression $$b_i(t) = \int_{-\infty}^{\infty} g_{ij}(t-\tau)a_j(\tau)d\tau = \int_{-\infty}^{\infty} g_{ij}(t')a_j(t-t')dt' \quad (10)$$

where $b_i(t)$ and $a_j(t)$ are the $i^{th}$ components of the time-dependent output and input vectors $b(t)$ and $a(t)$, and $g_{ij}(t)$ is the $(i,j)^{th}$ component of the Green's function matrix which describes the system. The standard summation convention has been employed over repeated indices. In the frequency domain, Equation (10) takes the simple form $$\tilde{B}_i(\omega)=\tilde{G}_{ij}(\omega)\tilde{A}_j(\omega) \quad (11)$$

where $\tilde{B}_i(\omega)$, $\tilde{A}_i(\omega)$, and $\tilde{G}_{ij}(\omega)$ are the Fourier transforms of $b_i(t)$, $a_i(t)$, and $g_{ij}(t)$, respectively (assuming these transforms exist).

Causality dictates that the output must vanish for times before the input has propagated through the system. Thus, we require $$\int_{-\infty}^{T} g_{ij}(\tau) a_j(t-\tau) d\tau = 0$$

where T must be greater than or equal to the relativistic propagation time. Since this relation must be satisfied for any choice of input, the components of the Green's function matrix vanish individually for all time prior to T. This directly implies that the components $\tilde{G}_{ij}(\omega)e^{-i\omega T}$ have analytic continuations for complex frequencies $\omega$ where Im($\omega$)>0 (i.e., the upper half-plane in complex frequency space). Therefore, it is possible to proceed in the usual way to show that the real and imaginary parts of each component $\tilde{G}_{ij}(\omega)$ satisfy the Kramers-Kronig dispersion relations assuming the components $\tilde{G}_{ij}(\omega)$ are square integrable:

$$\mathrm{Re}\,\tilde{G}_{ij}(\omega) = \frac{2}{\pi} P \int_0^\infty \frac{\Omega \mathrm{Im}\tilde{G}_{ij}(\Omega)}{\Omega^2 - \omega^2} d\Omega \qquad (12)$$

$$\mathrm{Im}\,\tilde{G}_{ij}(\omega) = -\frac{2\omega}{\pi} P \int_0^\infty \frac{\mathrm{Re}\,\tilde{G}_{ij}(\Omega)}{\Omega^2 - \omega^2} d\Omega \qquad (13)$$

where P denotes Cauchy's principal value.

The signals in our experiment can be expressed as $\tilde{A}(\omega) = \tilde{A}(\omega)e_A$ and $\tilde{B}(\omega) = \tilde{B}(\omega)e_B$, where $e_A$ and $e_B$ are unit vectors in real space, and $\tilde{A}(\omega)$ and $\tilde{B}(\omega)$ are the complex amplitudes of the incident and detected electric fields. In this special case where $e_A$ and $e_B$ are frequency-independent, Equation (11) implies that a scalar transfer function describes the relationship between the complex functions $\tilde{B}(\omega)$ and $\tilde{A}(\omega)$ $$\tilde{H}(\omega) = \frac{\tilde{B}(\omega)}{\tilde{A}(\omega)} = G_{ij} e_A^j e_B^i \qquad (14)$$

where $e_A^i$ and $e_B^i$ are the $i^{th}$ components of the unit vectors $e_A$ and $e_B$, respectively. Since the elements $\tilde{G}_{ij}(\omega)$ satisfy the Kramers-Kronig relations, it follows that the scalar function $\tilde{H}(\omega)$ must also satisfy them. However, the components of $\tilde{G}_{ij}(\omega)$ interfere with each other in $\tilde{H}(\omega)$.

It is this interference which leads to the superluminal effects in the experiment described here. The Green's-function matrix for the present birefringent system is $$\tilde{G}(\omega) \leftrightarrow \begin{pmatrix} e^{i\phi_{TE}(\omega)} & 0 \\ 0 & e^{i\phi_{TM}(\omega)} \end{pmatrix} \qquad (15)$$

where $\phi_{TE}(\omega) = n_{TE}(\omega)\omega d/c$ and $\phi_{TM}(\omega) = n_{TM}(\omega)\omega d/c$ are the frequency-dependent phases imparted to TE and TM polarizations, $n_{TE}(\omega)$ and $n_{TM}(\omega)$ represent the frequency-dependent indices of refraction for the two polarizations, d is the slab thickness, and c is the vacuum speed of light. Substituting these matrix elements into Equation (14), it is found that $$\tilde{H}(\omega) = \sin(\beta)\sin(\theta)e^{i\phi_{TE}(\omega)} + \cos(\beta)\cos(\theta)e^{i\phi_{TM}(\omega)}. \qquad (16)$$

For incident linear polarization at an angle of $\theta = \pi/4$ from the vertical, the magnitude and phase of the transfer function are, respectively, $$|\tilde{H}(\omega)| = \frac{1}{\sqrt{2}} \{1 + \sin(2\beta)\cos[\Delta\phi(\omega)]\}^{1/2} \qquad (17)$$

$$\arg[\tilde{H}(\omega)] = \arg[e^{i\phi_{TM}(\omega)}] + \arctan\left\{ \frac{\sin[\Delta\phi(\omega)]}{\cos[\Delta\phi(\omega)] + \cot(\beta)} \right\} \qquad (18)$$

where $\Delta\phi(\omega) = \phi_{TE}(\omega) - \phi_{TM}(\omega)$.

The transmission $|\tilde{H}(\omega)|$ has a minimum for $\Delta\phi(\omega_m) = (2m+1)\pi$ where $\omega_m$ is a half-waveplate frequency of the photonic crystal and m is an integer. For $\beta = \pi/4$, $|\tilde{H}(\omega_m)| = 0$ since the polarization which emerges from the slab has zero projection along the unit vector $e_B$. At this point, the phase $\arg[\tilde{H}(\omega)]$ is undefined since the transmission vanishes. For $\beta = \pi/4 \pm \epsilon$ where $0 < \epsilon << 1$, we find $$|\tilde{H}(\omega_m)| = \epsilon + \vartheta(\epsilon^3) \qquad (19)$$

$$\left.\frac{\partial \arg[\tilde{H}(\omega)]}{\partial \omega}\right|_{\omega_m} = \pm \frac{1}{2\epsilon} \left.\frac{\partial \Delta\phi(\omega)}{\partial \omega}\right|_{\omega_m} \qquad (20)$$

where $\tau_g = \partial \arg[\tilde{H}(\omega)]/\partial \omega$ is the group delay of the transmitted wave. As $\epsilon \to 0$ (i.e., as we approach the singularity in the transfer function), the transmission goes to zero at $\omega_m$ and the group delay is unbounded. For example, if $\beta = \pi/4 - \epsilon$ and $\partial \Delta\phi(\omega)/\partial\omega|_{\omega_m} > 0$ it is clear that the group delay can become superluminal, zero, or even negative depending on the value of $\epsilon$. On the other hand, the group velocity can be arbitrarily slowed if $\beta = \pi/4 + \epsilon$. Thus, if one were to measure the time of flight of an analytic pulse based on the arrival of its peak, any result can be obtained. However, there is no violation of causality here: the group velocity of the pulse has nothing to do with the signal velocity (i.e., the velocity of "information"), the quantity restricted by relativity. As we will demonstrate empirically, these superluminal group velocities are in fact required by causality through the Kramers-Kronig relations.

In FIGS. 16A and 16B, the results of this simple model described by Equations (17) and (18) are compared with the experimental results. The frequency-dependent phases $\phi_{TE}(\omega)$ and $\phi_{TM}(\omega)$ were calculated using an independent measurement of the indices of refraction of the photonic crystal. It is clear that the model correctly predicts the behavior of this system. Some discrepancies between the model and the experiment are observed at the edges of the plotted regions due to the effects of the band structure of the photonic crystal, which were not included in the model.

The interference between terms in $\tilde{H}(\omega)$ arises because of the two (polarization) modes available to light in this system. The birefringent photonic crystal allows a coupling between these modes, and energy can flow from one to the other.

In the system discussed here, the propagation speed (i.e., group velocity) of a polarized light pulse (i.e., wavepacket)

or waveform displays both fast (superluminal) and slow light behavior with a sharp transition between the two regimes due to the presence of a singularity in the transfer function of the system. This allows for total control over the speed of a wavepacket or waveform by adjusting the either the relative angular orientations of the birefringent crystal, the polarizer, and/or the incident EM wave polarization, and may have several important applications in optical signal processing and optical memory. In this particular system, the transmission goes to zero near the singularity; however, this is not a fundamental limitation and active systems with gain rather than loss can also be designed as delay lines using this principle of energy transfer between modes.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. Apparatus for controlling the polarization of an incident beam of electromagnetic radiation comprising:
   photonic crystal means, and
   means for directing said incident beam of electromagnetic radiation at said photonic crystal means,
   wherein said photonic crystal means comprises a crystalline lattice having cells with a defined periodic geometry that produces a polarization-dependent band structure by interference between Bragg reflections from many material interfaces for electromagnetic radiation, and wherein a portion of said beam is exponentially attenuated by said photonic crystal means and is reflected so that said apparatus functions as a reflection waveplate.

2. The apparatus of claim 1 wherein a portion of said incident beam is transmitted through said crystal, and wherein said transmitted and reflected portions of said incident beam can have any angle relative to said incident beam, whereby said apparatus is not limited by Brewster's angle.

3. Apparatus for controlling the polarization of an incident beam of electromagnetic radiation comprising:
   photonic crystal means, and
   means for directing said incident beam of electromagnetic radiation at said photonic crystal means,
   wherein said photonic crystal means comprises a crystalline lattice having cells with a defined periodic geometry that produces a polarization-dependent band structure by interference between Bragg reflections from many material interfaces for electromagnetic radiation, and wherein said incident beam of EM radiation includes first and second polarization components, and wherein said photonic crystal means reflects said first polarization component and transmits said second polarization component, thereby functioning as a polarizer.

4. An apparatus for maximizing conversion efficiency in nonlinear optical mixing processes between incoming, polarized optical beams and output, polarized optical beams comprising:
   birefringent photonic crystal means composed of material with optical nonlinearity for achieving phase matching of said output beams with said incoming beams, wherein said birefringent photonic crystal means is adapted to reduce the wavevector mismatch $\Delta k$ between said incoming and output beams to zero using said photonic crystal birefringence.

5. The apparatus of claim 4 wherein said photonic crystal means is composed of material which is not naturally birefringent.

6. The apparatus of claim 4 wherein said photonic crystal means is adapted to achieve phase matching without the use of or minimal use of angle tuning or temperature tuning.

7. The apparatus of claim 4 wherein said polarized input beam has frequency $w_1$ and first wavevector $k_1$, and said polarized output beam has frequency $mw_1$ and second wavevector $k_2$, wherein said photonic crystal is adapted to reduce the wavevector mismatch between input and output beams to zero.

8. The apparatus of claim 4 wherein said photonic crystal means is adapted to eliminate the walk-off of ordinary and extraordinary waves characteristic of phase matching with angle tuning.

9. An optical apparatus for creating a delay line arising from a transfer of energy between two different polarizations of electromagnetic (EM) waves, comprising:
   birefringent crystal means,
   polarizer means in series with said birefringent crystal means, and
   means for directing said EM wave through said birefringent crystal means and said polarizer means,
   wherein either a delayed or advanced transmitted electromagnetic waveform or wavepacket results by adjusting either the relative angular orientations of said birefringent crystal means, said polarizer means, and/or said incident EM wave polarization.

* * * * *